US010713341B2

(12) United States Patent
McNulty et al.

(10) Patent No.: US 10,713,341 B2
(45) Date of Patent: Jul. 14, 2020

(54) SYSTEM, METHOD AND APPARATUS FOR GENERATING ACOUSTIC SIGNALS BASED ON BIOMETRIC INFORMATION

(71) Applicants: Scott F. McNulty, Rowayton, CT (US); Matthew S. McNulty, Rowayton, CT (US)

(72) Inventors: Scott F. McNulty, Rowayton, CT (US); Matthew S. McNulty, Rowayton, CT (US)

( * ) Notice: Subject to any disclaimer, the term of this patent is extended or adjusted under 35 U.S.C. 154(b) by 0 days.

(21) Appl. No.: 14/621,922

(22) Filed: Feb. 13, 2015

(65) Prior Publication Data

US 2015/0161461 A1 Jun. 11, 2015

Related U.S. Application Data

(63) Continuation-in-part of application No. 14/293,683, filed on Jun. 2, 2014, which is a continuation of application No. 13/905,848, filed on May 30, 2013, now Pat. No. 8,744,139, which is a continuation-in-part of application No. 13/181,940, filed on Jul. 13, 2011, now Pat. No. 8,958,610.

(51) Int. Cl.
*G06F 21/32* (2013.01)
*G06K 9/00* (2006.01)

(52) U.S. Cl.
CPC ......... *G06F 21/32* (2013.01); *G06K 9/00073* (2013.01); *G06K 9/00114* (2013.01)

(58) Field of Classification Search
CPC . G06F 21/32; G06K 9/00073; G06K 9/00114
See application file for complete search history.

(56) References Cited

U.S. PATENT DOCUMENTS

| 5,303,207 | A | * | 4/1994 | Brady | .................... | H04B 13/02 |
|---|---|---|---|---|---|---|
| | | | | | | 367/134 |
| 7,207,935 | B1 | * | 4/2007 | Lipo | ........................ | A61B 5/16 |
| | | | | | | 600/28 |
| 7,966,497 | B2 | * | 6/2011 | Gantman | ........... | G06Q 20/3272 |
| | | | | | | 380/255 |
| 2003/0039343 | A1 | * | 2/2003 | Brodnick | ............... | H04M 11/06 |
| | | | | | | 379/93.37 |
| 2004/0096086 | A1 | * | 5/2004 | Miyasaka | ........... | G06F 3/03547 |
| | | | | | | 382/124 |
| 2005/0129291 | A1 | * | 6/2005 | Boshra | ............... | G06K 9/00026 |
| | | | | | | 382/124 |
| 2008/0046246 | A1 | * | 2/2008 | Goldstein | ............... | H04S 1/005 |
| | | | | | | 704/258 |

(Continued)

OTHER PUBLICATIONS

Frodigh, Magnus, Per Johansson, and Peter Larsson. "Wireless ad hoc networking: the art of networking without a network." Ericsson Review 4.4 (2000): 249.*

(Continued)

*Primary Examiner* — Wesley J Tucker

(57) ABSTRACT

An apparatus, method and system are provided for sensing an individual's biometric information, and generating and transmitting an acoustic signal representative of the sensed biometric information. The acoustic signal may be transmitted as an audio signal or an ultrasonic signal to another apparatus in the system for authentication or verification of the individual's identity.

56 Claims, 13 Drawing Sheets

Major & Minor Root Scale

(56) References Cited

U.S. PATENT DOCUMENTS

| | | | | |
|---|---|---|---|---|
| 2008/0159571 | A1* | 7/2008 | Hooley | H04R 1/403 |
| | | | | 381/307 |
| 2008/0229400 | A1* | 9/2008 | Burke | G06F 21/32 |
| | | | | 726/7 |
| 2010/0053169 | A1* | 3/2010 | Cook | G06F 3/16 |
| | | | | 345/440.1 |
| 2010/0075631 | A1* | 3/2010 | Black | H04M 1/05 |
| | | | | 455/410 |
| 2010/0102939 | A1* | 4/2010 | Stewart | G10H 1/34 |
| | | | | 340/384.1 |
| 2010/0192754 | A1* | 8/2010 | Kim | G10H 1/0025 |
| | | | | 84/611 |
| 2013/0278380 | A1 | 10/2013 | Stewart | |
| 2014/0050321 | A1* | 2/2014 | Albert | H04W 12/04 |
| | | | | 380/270 |
| 2014/0074479 | A1 | 3/2014 | Kassam et al. | |
| 2015/0018660 | A1 | 1/2015 | Thomson et al. | |
| 2015/0269420 | A1* | 9/2015 | Kim | G06F 21/32 |
| | | | | 382/118 |

OTHER PUBLICATIONS

Gerasimov, Vadim, and Walter Bender. "Things that talk: using sound for device-to-device and device-to-human communication." IBM Systems Journal 39.3.4 (2000): 530-546.*

Lopes, Cristina Videira, and Pedro MQ Aguiar. "Acoustic modems for ubiquitous computing." IEEE Pervasive Computing 3 (2003): 62-71.*

Li, Chuan, David A. Hutchins, and Roger J. Green. "Short-range ultrasonic communications in air using quadrature modulation." IEEE transactions on ultrasonics, ferroelectrics, and frequency control 56.10 (2009): 2060-2072.*

Search Report and Written Opinion dated May 6, 2016 in corresponding PCT Application Serial No. PCT/US16/17783.

* cited by examiner

SYSTEM, METHOD AND APPARATUS FOR GENERATING ACOUSTIC SIGNALS BASED ON BIOMETRIC INFORMATION

CROSS-REFERENCE TO RELATED APPLICATIONS

This application is a continuation-in-part of U.S. patent application Ser. No. 14/293,683, which is a continuation of U.S. patent application Ser. No. 13/905,848, filed May 30, 2013, now U.S. Pat. No. 8,744,139, which is a continuation-in-part of U.S. patent application Ser. No. 13/181,940, filed Jul. 13, 2011, which are incorporated herein by reference. Through U.S. patent application Ser. No. 13/905,848, this application claims the priority of U.S. Provisional Application No. 61/653,046, filed May 30, 2012, which is incorporated herein by reference.

FIELD OF THE INVENTION

The present invention relates to a system, method and apparatus for generating an acoustic signal or digital data communication representative of an individual's unique biometric information.

BACKGROUND

Biometric identification systems use sensor technologies to obtain information regarding an individual's unique physical characteristics and compare the obtained information with verified reference information to confirm the identity of the individual. Known biometric identification systems have used optical, thermal, capacitive, impedance, radio-frequency, conductance and ultrasonic based sensors for detecting biometric information.

Physical characteristics that are commonly used for biometric identification include unique features from an individual's facial features or geometry, iris, hand geometry, vein pattern, voice, palm and fingerpads. The most predominantly used physical characteristics for biometric identification are the minutiae or macrofeatures found on the dermal surface of an individual's fingerpad. For example, an individual's fingerpad is covered with a pattern of ridges and valleys commonly referred to as a fingerprint. A typical fingerprint scan contains about 30 to 40 minutiae and macrofeatures which are unique biometric identification characteristics. The dermal surface of an individual's finger also has between 50 and 300 sweat gland pores located on the fingerprint ridges. Like an individual's fingerprint, the number and locations of sweat gland pores on an individual's fingerpad do not change and provide unique biometric identification characteristics. Moreover, the locations of an individual's sweat gland pores relative to the fingerprint minutiae or macrofeatures provides an additional biometric identification measure.

The common traits to biometric identification measures are their permanence and uniqueness. However, these basic traits also make the biometric identification systems vulnerable to spoofing. Spoofing is the act of using an artificial biometric sample (such as a "fake finger") containing a replica of an authorized individual's fingerpad to enable an unauthorized individual to gain access to a secured system. Spoofing may also be used to enable an individual to pass himself off as another individual at a security checkpoint. Typically, the replicated fingerpad is formed of a synthetic material such as gelatin (including gummi which is obtained by gelling aqueous solution of gelatin), silicone, epoxy, latex and the like.

Anti-spoofing systems typically are designed to detect the liveness of the physical sample presented to the biometric detection sensor. Most of these systems involve relatively large sensors which are unacceptable for mobile or portable devices. In addition, anti-spoofing systems are typically directed to detecting a liveness measure of the finger such as finger surface resistance, temperature, pulse, moisture, and blood oximetry. These systems, however, can be circumvented because they operate by comparing the detected liveness measure value to a predetermined acceptable range. Namely, it is possible to design an artificial biometric sample which produces a detected liveness measure within a known acceptable range. For example, artificial biometric samples can be made of materials with electrical properties resembling that of a living finger and which yield a biometric liveness measure within a given acceptable range.

SUMMARY OF THE INVENTION

According to one object of the invention, the device transmits an acoustic signal representative of the detected biometric information. The acoustic signal may be either an audio signal or an ultrasonic signal.

According to another object of the invention, the device transmits a wireless communication containing digitized data representative of the detected biometric information.

According to another objection of the invention, the biometric device is configured to generate a visual display upon detecting and processing an individual's biometric information.

According to a further objection of the invention, the biometric device may be a portable device configured to transmit a communication representative of the detected biometric information to an external device that, in turn, is configured to generate a visual display based on the detected biometric information.

It is another object of the present invention to provide a portable biometric device which detects, processes and transmits biometric information to an external device which, in turn, emits an audio acoustic signal and/or visual display representative of the biometric information

DESCRIPTION OF DRAWINGS

These and other aspects of the invention will be described with reference to the drawings, in which.

DETAILED DESCRIPTION OF THE INVENTION

Figure 1:
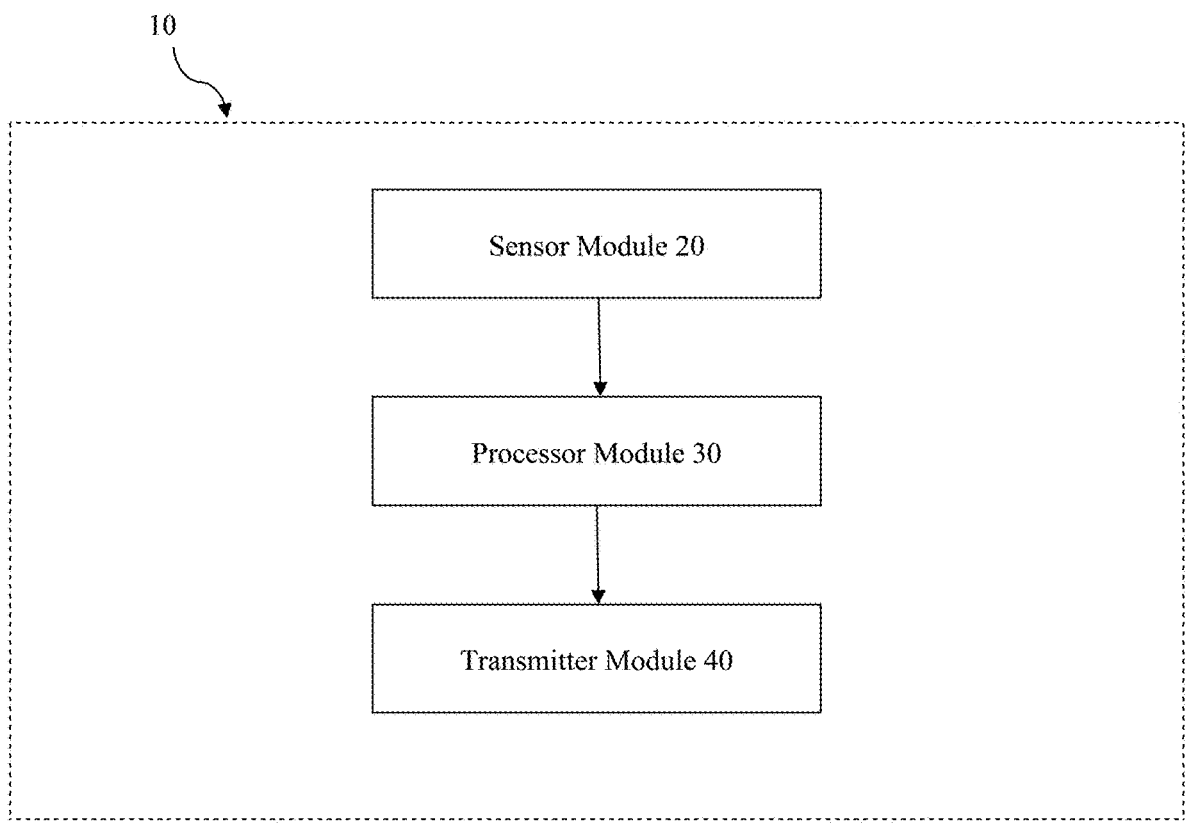
FIG. 1 is a block diagram of an exemplary embodiment of the present invention.

With reference to FIG. 1, an embodiment of the present invention comprises a device 10 having a sensor module 20 configured to detect an individual's biometric information, a processing module 30 configured to process the detected biometric information to an acoustic signal or digital data communication, and a transmitter module 40 configured to generate and emit an acoustic signal or a digital data communication. It will be understood that each of these modules may be integrated in a single unit or deployed in two or more separate units.

Sensor Module

The sensor module 20 is configured to detect a unique biometric characteristic of an individual, such as an individual's fingerprints, sweat gland pores, voice, facial features, iris, eye shape, ear shape, hand geometry, vein patterns, gestures, writing sample, DNA, skin color, body vibration, brain wave, electromagnetic field or aura, balance, body scent, or any other known biometric. The sensor module 20 may implement any of a number of different detection methods including electromagnetic, optical, ultrasound or solid state, and may comprise a capacitive, impedance, RF, conductance, thermal and/or piezoelectric device. It will be understood that sensor module 20 may be configured to obtain analog-based biometric information and/or digital-based biometric information.

By way of example, sensor module 20 may comprise an optical sensor such as a high resolution CCD array camera for detecting an individual's fingerprints, sweat gland pores, facial features, iris, eye shape, ear shape, hand geometry, gestures, writing sample. By way of further example, sensor module 20 may comprise a spectrometer for detecting an individual's voice, vein pattern, DNA, skin color, body vibration, electromagnetic field or aura, brain wave, balance, body scent or any other known biometric.

Figure 2:
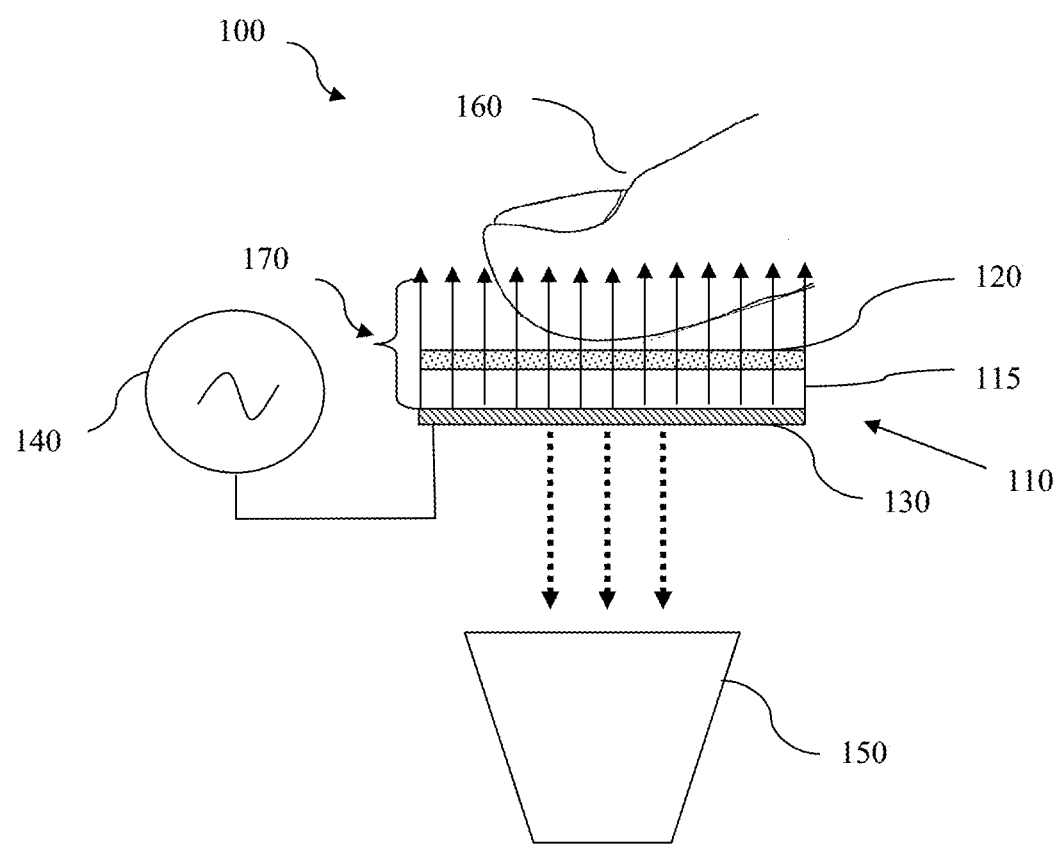
FIG. 2 is a schematic diagram illustrating an exemplary embodiment of a sensor module that may be used with the present invention.
Figure 10:
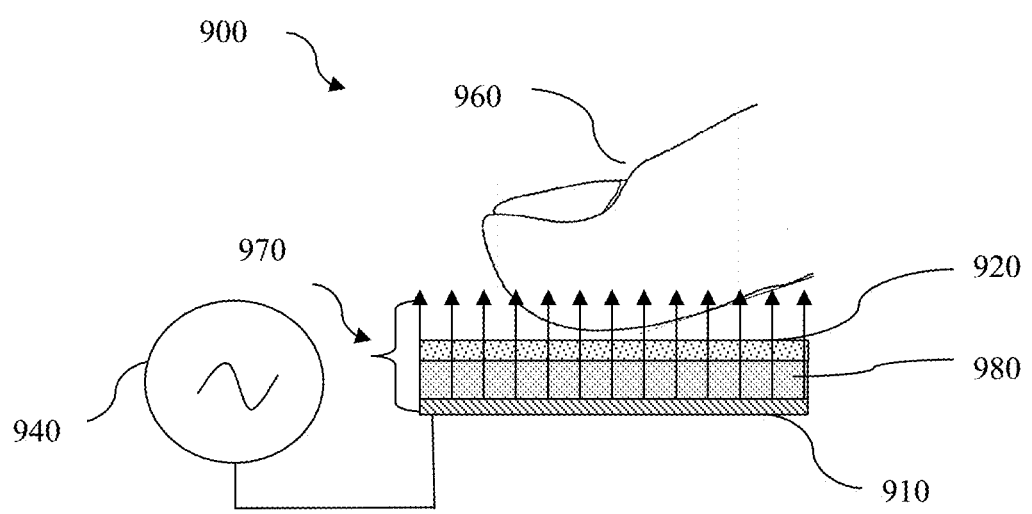
FIG. 10 is a schematic diagram illustrating an exemplary embodiment of a sensor module that may be used with the present invention.

Furthermore, sensor module 20 may comprise a device such as illustrated in FIG. 2 and FIG. 10 that is configured to detect both permanent and variable unique physical characteristics so as to provide identification, authentication and/or proof of liveness of the individual. For the purpose of illustrating various aspects of the present invention, the devices in FIGS. 2 and 10 will be used herein as exemplary embodiments of sensor modules.

FIG. 2 is a schematic diagram illustrating an exemplary embodiment of a sensor module that may be used with the present invention. As shown in FIG. 2, sensor module 100 comprises a voltage source 140, a transparent electrode 110, and an image capture device 150. Voltage source 140 is configured to generate an electrical current through transparent electrode 110, which induces an electromagnetic field 170.

Preferably, voltage source 140 is an alternating current voltage source and the resulting alternating electrical current transmitted through transparent electrode 110 is between about 0.01 milliamps and about 25 milliamps, and more preferably between about 0.5 milliamps and about 5.0 milliamps. In addition, the resulting alternating electrical current transmitted through transparent electrode 110 preferably has a frequency of about 60 Hz or less, and more preferably between about 20 Hz to about 50 Hz.

It will be understood, however, that any electrical current that induces an electromagnetic field which enables biometric identification and/or proof of liveness based on the detection and analysis of sweat gland pores falls within the scope of the present invention. For example, a current greater than about 25 milliamps may be used if a suitable insulator is used to prevent physiological reaction with an individual's dermal surface. Similarly, a current less than about 0.01 milliamps may be used if a suitable amplifier or other device is used to enable the detection of the variations, fluctuations or disturbances to the electromagnetic field caused by the interaction with the individual's dermal surface. In addition, the electromagnetic field may be induced by a pulsed electrical current. Although not shown in FIG. 2, it will be appreciated that the electrical circuitry of apparatus 100 is configured to provide the desired electrical current through the electrode 110, which, in turn, induces electromagnetic field 170.

Transparent electrode 110 may comprise a transparent glass substrate 115 having a transparent current conductive coating layer 130 on its bottom surface. In addition, the top surface of the transparent electrode 110 is dimensioned to receive the individual's fingerpad and may be coated with a transparent polymer material 120 to prevent electrical charge from being transmitted to the individual's fingerpad. It will be understood that transparent electrode 110 may be configured to receive multiple fingerpads, a palm or any other skin surface having sweat gland pores. The transparent glass substrate may also comprise optical glass formed of glass fiber strands.

Image capture device 150 is configured to capture an image of the fluoresced biological points representing the location, size, shape and activity of sweat gland pores on the fingerpad placed in the proximity of the transparent electrode 110. Image capture device 150 may comprise a solid state camera such as a computer controlled CCD array camera configured to capture real-time visualization of the fingerpad image or a spectrophotometer. It will be understood that the image capture device may alternatively capture a negative of the image, thereby representing the biological points as black points on a white background.

Without wishing to be bound by any scientific theory and explanation, applicant believes that the electrical current produced by the voltage source 140 induces an electromagnetic field 170 in the vicinity of the transparent electrode 110. When an individual's finger is placed in the proximity of the top surface of transparent electrode 110, electromagnetic field 170 stimulates and excites molecules associated with complex metabolic waste substances (such as sweat gland amino acid molecules), loosely bound atmospheric water vapor residing on the dermal surface of an individual's fingerpad, and other materials including atomic oxygen. This, in turn, causes compounds adjacent to the ions within the excited molecules to become visible or fluoresce. It is further believed that the fluoresced molecules travel along the dermal surface to open sweat pores because the high levels of salt, water and amino acid in the sweat glands provides a superior grounding path for the ions.

Apparatus 100 may be adapted to capture an image containing both a fingerprint pattern and fluoresced points identifying the sweat pores. For example, it will be understood that the resolution of the image capture device 150 and/or the voltage, rate and/or duration of the electrical charge generated by voltage source 140 may be modified to capture an image of both the fingerprint and fluoresced points on the fingerpad. Capture of the fingerprint image does not require an external light source reflected on the fingerpad because the fingerprint is illuminated by the fluorescence of the excited molecules caused by the electromagnetic field 170.

Figure 3:
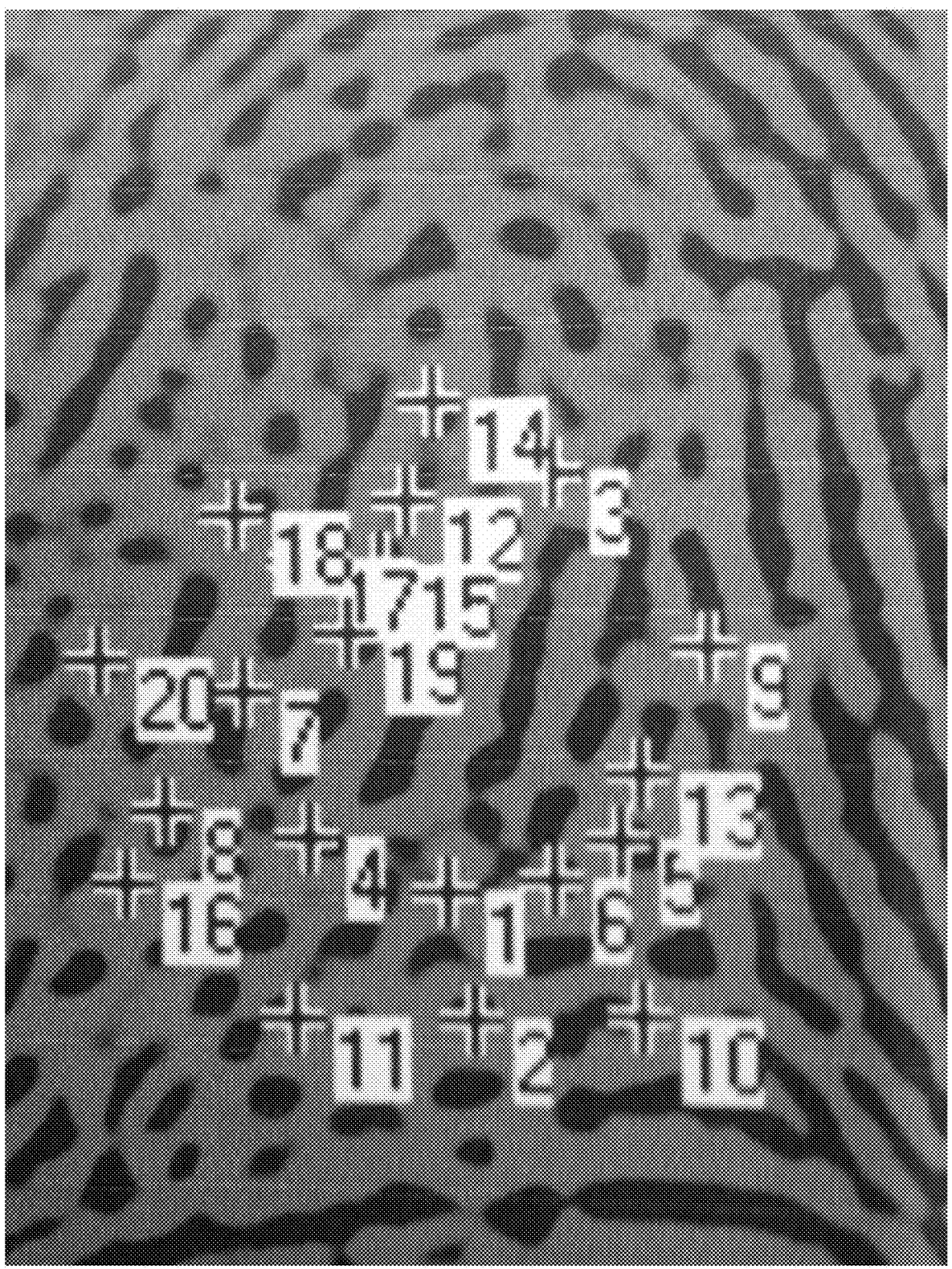
FIG. 3 is an exemplary illustration of a fingerpad image produced according to the exemplary embodiment of the sensor module shown in FIG. 2.

Alternatively, apparatus 100 may be configured to separately capture an image of the points of fluorescence corresponding to the sweat gland pore locations and an image of the fingerprints. According to this configuration, apparatus 100 may include a light source and the fingerprint biometric information may be obtained by image capture device 150. It will be appreciated that the fingerprint biometric information may also be obtained using a scanner or any other type of known system for fingerprint sensing. If separately obtained, the system may be configured to juxtapose the sweat gland pore and fingerprint biometric information as shown in FIG. 3 to map the locations of the sweat gland pores relative to the fingerprints and provide a third biometric measure.

FIG. 10 is a schematic diagram illustrating another exemplary embodiment of a sensor module which may be used with the present invention. As shown in FIG. 10, the sensor module 900 comprises a voltage source 940, an electrode 910 and an electromagnetic field reader 980. Voltage source 940 is configured to generate an electrical current through electrode 910, which induces an electromagnetic field 970.

Preferably, voltage source 940 is an alternating current voltage source and the resulting alternating electrical current transmitted through electrode 910 is between about 0.01 milliamps and about 25 milliamps, and more preferably between about 0.5 milliamps and about 5.0 milliamps. In addition, the resulting alternating electrical current transmitted through transparent electrode 910 preferably has a frequency of about 60 Hz or less, and more preferably between about 20 Hz to about 50 Hz.

It will be understood, however, that any electrical current that induces an electromagnetic field which enables biometric identification and/or proof of liveness based on the detection and analysis of sweat gland pores falls within the scope of the present invention. For example, a current greater than about 25 milliamps may be used if a suitable insulator is used to prevent physiological reaction with an individual's dermal surface. Similarly, a current less than about 0.01 milliamps may be used if a suitable amplifier or other device is used to enable the detection of the variations, fluctuations or disturbances to the electromagnetic field caused by the interaction with the individual's dermal surface. In addition, the electromagnetic field may be induced by a pulsed electrical current. Although not shown in FIG. 10, it will be appreciated that the electrical circuitry of apparatus 900 is configured to provide the desired electrical current through the electrode 910, which, in turn, induced electromagnetic field 970.

As shown in FIG. 10, electromagnetic field reader 980 may be integrally formed with electrode 910. Alternatively, it will be understood that electromagnetic field reader 980 may be positioned separately from electrode 910 at any location that is suitable for monitoring electromagnetic field 970. The top surface of the apparatus configured to receive the individual's fingerpad may optionally be coated with a polymer material 920 to prevent electrical charge from being transmitted to the individual's fingerpad.

According to this embodiment, the electrode 910 is configured to emit an electromagnetic field 970 induced by the electrical current generated by voltage source 940. Electromagnetic field reader 980 is configured to detect and capture information regarding electromagnetic field 970, including any variations, fluctuations or disturbances thereto when an individual's fingerpad is placed in the proximity of electromagnetic field 970. Apparatus 900 may include a controller (not shown) configured to interface with the electromagnetic field reader 980 and analyze the electromagnetic field information detected by the electromagnetic field reader 980 when the individual's fingerpad is placed in the proximity of electromagnetic field 970. The controller may comprise a graphics processor capable of storing, processing and/or generating an image representative of the electromagnetic field information detected by electromagnetic field reader 980.

Processor Module

The processor module 30 may comprise a controller configured to process, store, search, identify, instruct, generate, compare, match, and/or update data. The controller may be based on common computer systems that may comprise, but are not limited to, components such as a computer systemization connected to memory.

According to one aspect of the present invention, the processor module 30 comprises a controller configured to process an acoustic signal derived from and representative of the detected biometric information. By way of example, the processor module 20 may comprise a sub-module having one or more algorithms loaded as software or firmware, or hardwired into the controller for processing the detected biometric information to an acoustic signal.

It will be understood that processor module 20 may comprise an analog-to-digital module for processing analog-based detected biometric information to a digital data signal, an analog-to-analog module for processing analog-based detected biometric information to an analog signal, and/or a digital-to-analog module for processing digital-based biometric information to an analog signal. Alternatively, processor module 30 may be configured to process digital-based or analog-based detected biometric information to a digital data communication signal.

Figure 7:
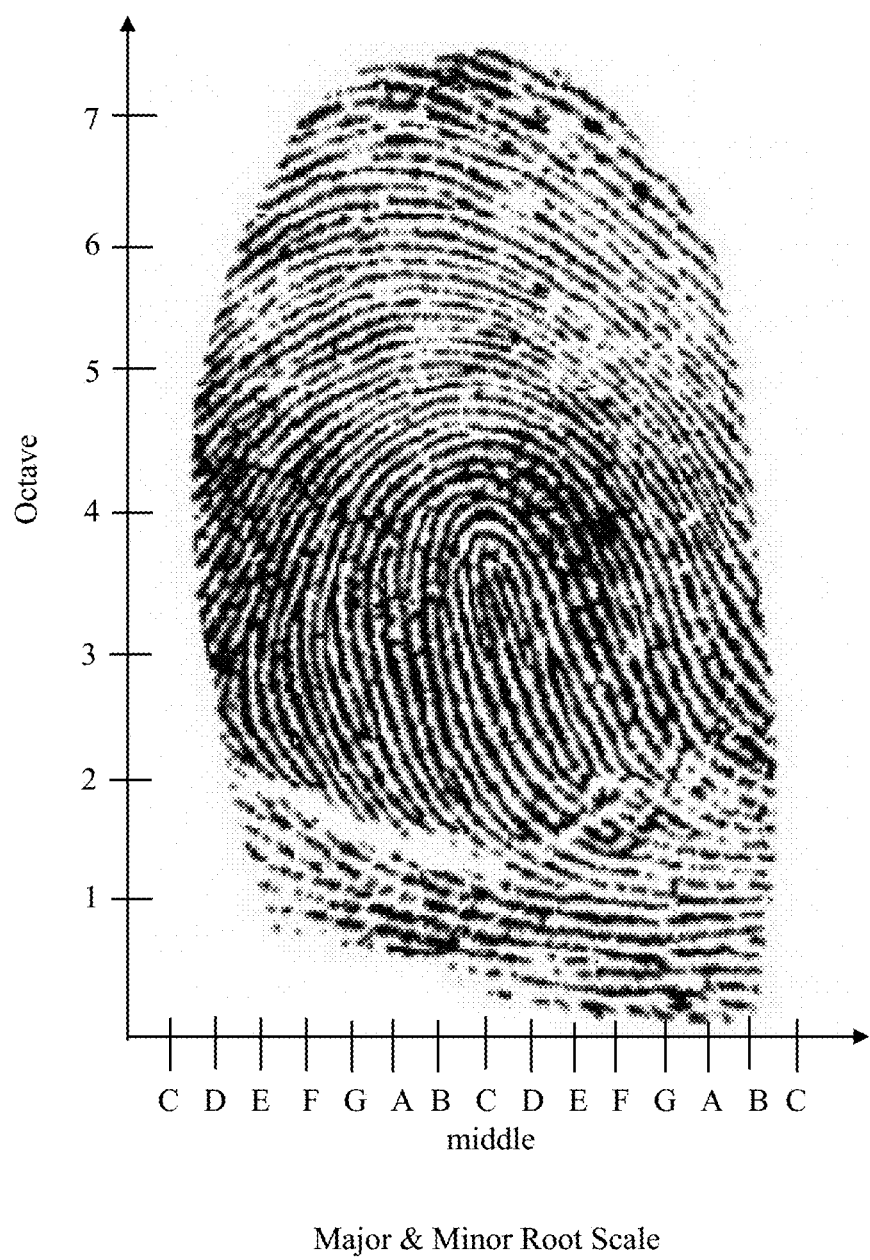
FIG. 7 is a schematic illustrating an embodiment of a methodology employed by the processing module to process an acoustic signal representative of the detected biometric information.
Figure 8:
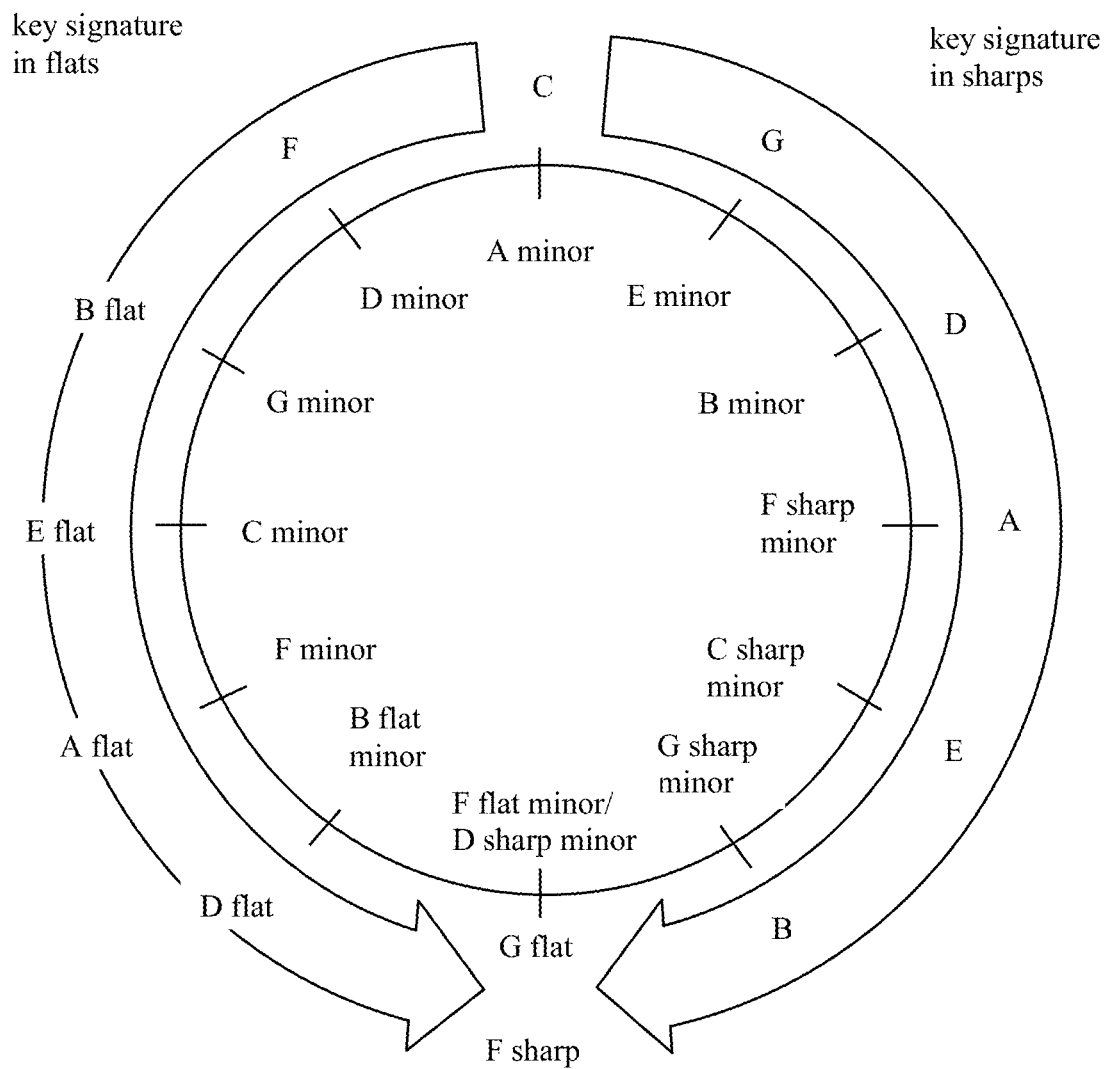
FIG. 8 is a schematic illustrating another embodiment of a methodology employed by the processing module to process an acoustic signal representative of the detected biometric information.

Exemplary methodologies and algorithms for generating an acoustic signal or digital data communication signal based on the sensed biometric information are described herein with reference to FIGS. 7 and 8. The present invention may, however, be embodied in many different forms. including variations to and combinations of these exemplary methodologies and algorithms, as well as other alternative methodologies and algorithms.

FIG. 7 illustrates an exemplary methodology that may be used by the processor module 30 to process the detected biometric information to an acoustic signal. It is understood that an individual's fingerprint scan typically contains about 30 to 40 unique minutiae and macrofeatures. According to the methodology illustrated in FIG. 7, the location of each of these unique minutiae and macrofeatures is designated two different musical values using a two dimensional Cartesian coordinate system. With reference to the exemplary two dimensional musical value coordinate system of FIG. 7, each unique minutiae and macrofeature will have an octave key signature value and major & minor root scale key signature value based on its position on the two dimensional coordinate system. An arrangement of two or more of these resulting octave/major & minor root scale musical values may be used to generate a unique "musical pattern" representative of the individual's sensed biometric information.

It will be understood that the two dimensional coordinate system of FIG. 7 may use any two musical elements such as: (1) key signatures, including octave scale, major & minor root scale, individual notes, chords, scales, inversion and chromatic scales; (2) meter, including tempo, rhythm, beat, cadence; (3) reverb; and (4) volume amplitude or velocity, base intensity, etc.

It will be further understood that a three dimensional coordinate system may be used having three different musical elements. For example, in addition to assigning each unique minutiae and macrofeature two musical elements based on its position using two dimensions of the coordinate system, each unique minutiae and macrofeature may be assigned a third musical element based on its configuration (e.g., depth, width or contour of fingerprint ridge or valley, distance between fingerprint ridges or valleys). In this example, each unique minutiae and macrofeature may have first and second musical elements (e.g., octave and major & minor root scale key signature values) based on its position relative to two dimensions of the three dimensional coordinate system and a third musical element (e.g., volume, amplitude, velocity, base intensity, etc.) based on a characteristic of the configuration of each minutiae and macrofeature or a combination of minutiae and macrofeatures (e.g., positional relationship of a cluster of minutiae and macro features).

It will be understood that the exemplary two dimensional coordinate system shown in FIG. 7 may be applied to other unique biometric information (sweat gland pores, voice, facial features or geometry, iris pattern, hand geometry, vein pattern, gestures, writing sample, DNA, skin color, body vibration, electromagnetic field or aura, brain wave, balance and/or body scent) to yield a "musical pattern." For example, the location, shape, size, positional relationship and activity level of sweat gland pores located on an individual's dermal surface may be the biometric information used in conjunction with the two dimensional coordinate system shown in FIG. 7 for generating a musical representation. In the same manner as described above with regard to fingerprint minutiae and macrofeatures, each sweat gland pore will have two different musical elements (e.g. octave scale key signature and major & minor scale key signature), and an arrangement of the musical elements for two or more sweat gland pore locations can be used to generate a "musical pattern" representative of the individual's unique biometric information.

As further described above with regard to fingerprint and macrofeatures, the detected sweat gland pores may have a third musical element (e.g., volume, base intensity, etc.) based on another unique characteristic (e.g., size, shape, activity level, degree of detected fluorescence) of each sweat gland pore or a combination of sweat gland pores (e.g., positional relationship of a cluster of sweat gland pores). The use of any variable sweat gland pore characteristics such as the number of open/closed sweat gland pores, or the size, activity level or degree of fluorescence of open sweat gland pores provides for at least a slightly different musical representation each time the individual's biometrics are measured. Since the brightness of the fluorescence or level of sweat gland pore activity may indicative of an individual's mood or psychological state, these variable sweat gland pore biometrics may be used to vary the volume or tempo of the musical representation.

It will be understood that other methodologies can be used for analysis of the biometric information in connection with the two dimensional Cartesian coordinate system illustrated in FIG. 7. For example, the fingerprint biometric information contained in the image shown in FIG. 7 can be represented by a two dimensional gray-scale matrix by assigning gray-scale values for each pixel in the image. The two dimensional gray scale matrix may be converted to a one-dimensional projection relative to either axis of the two dimensional coordinate system. For example, this can be achieved by calculating the sum of all of the gray scale values for the pixels in each column along the axis defined by the major & minor root scale values. Alternatively, the one-dimensional projection may be calculated by calculating the average gray-scale value for all of the pixels in each column along the axis defined by the major & minor root scale. Each point on the one-dimensional projection will have an octave key signature value and major & minor root scale key signature value based on its position on the two dimensional coordinate system. An arrangement of two or more of these resulting octave/major & minor root scale musical values may be used to generate a unique "musical pattern" representative of the individual's sensed biometric information.

FIG. 8 illustrates another exemplar methodology that may be used to by the processor module 30 to generate a musical representation of an individual's unique biometric information. The particular arrangement and selection of key signatures provided in FIG. 8 are illustrative and other arrangements and combinations can be used in place of those provided in FIG. 8. Moreover, the methodology and algorithm may be adapted to permit an individual to be involved in the selection of the musical elements or arrangement for generating the musical representation. In addition, other musical elements and combinations of musical elements can be used in place of those provided in FIG. 8.

On embodiment of the methodology illustrated in FIG. 8 will be described with reference to the unique number and locations of fingerprint minutiae and macrofeatures. According to this embodiment, each minutiae and macrofeature is positioned on a radial axis of the coordinate system. Based on the point of intersection of the radial axis with the inner and outer rings of the coordinate system, each minutiae and macrofeature has two musical values—a first musical value corresponding to the intersection point of the radial axis with the inner ring of the coordinate system and a second musical value corresponding to intersection point of the radial axis with the outer ring of the coordinate system. Although the illustrative example shown in FIG. 8 is scaled to provide 12 different key signature values in each of the inner and outer rings, the number and values of the key signatures in each of the inner and outer ring may be varied. The total musical properties for the musical biometric representation are 24 major & minor keys, seven octaves (not using the minor third) and 26 key signatures, each in sharp and flat. Furthermore, it will be understood that the points of intersection of each radius with the inner and outer rings between any two key signature scale value corresponds to an extrapolated key signature value based on the two adjacent key signature scale values. An arrangement of the musical values for a combination of any two or more of these fingerprint minutiae/macrofeature locations may be used to generate a unique "musical pattern" representative of the individual's sensed biometric information.

In addition, it will be appreciated that each minutiae and macrofeature may have a third musical element (e.g., volume, amplitude, velocity, base intensity, etc.) corresponding to the distance of the minutiae/macrofeature location from the pole or centerpoint of the coordinate system. Moreover, each minutiae and macrofeature may have yet another musical element (e.g., tempo, rhythm, pace) based on a characteristic of the configuration of each minutiae and macrofeature or a combination of minutiae and macrofeatures (e.g., positional relationship of a cluster of minutiae and macro features).

According to another embodiment of the methodology illustrated in FIG. 8, the coordinate system defines sectors between adjacent musical elements designated on the inner ring. The polar coordinate system shown in FIG. 8 has 12 different sectors. Each such sector corresponds to a pair of musical elements—one on the inner ring and a second on the outer ring. For example, the sector defined by the radial lines intersecting the A minor and E minor points on the inner ring corresponds to an E minor and a G musical elements. Similarly, the sector defined by the radial lines intersecting the E minor and B minor points on the inner ring corresponds to a B minor and a D musical elements. Any minutiae or macrofeature contained within a particular sector will be assigned the two musical elements corresponding to that sector. each minutiae and macrofeature may have a third musical element (e.g., volume, amplitude, velocity, base intensity, etc.) corresponding to the distance of the minutiae/macrofeature location from the pole or centerpoint of the coordinate system. Moreover, each minutiae and macrofeature may have yet another musical element (e.g., tempo, rhythm, pace) based on a characteristic of the configuration of each minutiae and macrofeature or a combination of minutiae and macrofeatures (e.g., positional relationship of a cluster of minutiae and macrofeatures).

As discussed above with regard to the methodology illustrated in FIG. 7, it will be understood that the methodology illustrated in FIG. 8 may be applied to other unique biometric information (sweat gland pores, voice, facial features or geometry, iris pattern, hand geometry, vein pattern, gestures, writing sample, DNA, skin color, body vibration, electromagnetic field or aura, brain wave, balance and/or body scent) to yield a "musical pattern." For example, the location, shape, size, positional relationship and activity level of sweat gland pores located on an individual's dermal surface may be a biometric information used in conjunction with the coordinate system shown in FIG. 8 for generating a musical representation. Each sweat gland pore is located on a radial axis of the coordinate system shown in FIG. 8. Accordingly, based on the point of intersection of the radial axis with the inner and outer rings of the coordinate system, each sweat gland pore will have will have two different musical element values a first musical value corresponding to the intersection point of the radial axis with the inner ring of the coordinate system and a second musical value corresponding to intersection point of the radial axis with the outer ring of the coordinate system. An arrangement of the musical values for a combination of any two or more of these sweat gland pore locations may be used to generate a unique "musical pattern" representative of the individual's sensed biometric information.

In addition, it will be appreciated that each sweat gland pore may have a third musical element (e.g., volume, amplitude, velocity, base intensity, etc.) corresponding to the distance of the minutiae/macrofeature location from the pole or centerpoint of the coordinate system. Moreover, each sweat gland pore may have yet another musical element (e.g., tempo, rhythm, pace) based on another unique characteristic (e.g., size, shape, activity level, degree of detected fluorescence) of each sweat gland pore or a combination of sweat gland pores (e.g., positional relationship of a cluster of sweat gland pores). The use of any variable sweat gland pore characteristics such as the number of open/closed sweat gland pores, or the size, activity level or degree of fluorescence of open sweat gland pores provides for at least a slightly different musical representation each time the individual's biometrics are measured. Since the brightness of the fluorescence or level of sweat gland pore activity may indicative of an individual's mood or psychological state, these variable sweat gland pore biometrics may be used to vary the volume or tempo of the musical representation.

It will be understood that because the exemplary methodologies described above with reference to FIGS. 7 and 8 use basic musical elements, such as keys and more particularly key signatures, the resulting music patterns derived from the sensed biometric information will sound pleasant to the ear. A key signature is a combination of notes arranged in a particular set. There are twelve major keys and twelve minor keys making twenty four keys altogether. Each of these keys have seven unique notes and each key is different from all the others. Within a key signature, any set of notes in any order will sound appealing. Similarly, the use of other musical elements, such as chords and the inversion of chords, creates harmony between notes and will also contribute to the appealing sound of the musical pattern. In addition, the use of modes as a musical element functions in the same manner as key signatures to provide an appealing musical pattern.

It will also be understood that the polar coordinate system illustrated in FIG. 8 may comprise an irregular shaped two-dimensional plane, and not simply a circular two-dimensional plane.

It will be understood that the processor module 20 may be configured with algorithms for processing different audio acoustic signals defined as being within the human hearing frequency range (i.e., typically between 20 Hz and 20 KHz). Moreover, the processor module 20 may be configured with algorithms to process the detected biometric information to an ultrasonic acoustic signal defined as being above the upper limit of the human hearing frequency range (i.e., above 20 KHz).

In addition, the processor module 30 may be configure with algorithms to process the detected biometric information to a digital data communication representative of the biometric information. This may be done by any of a number of different techniques, including gray-scale analysis wherein a two-dimensional gray scale matrix is created by assigning gray-scale values for each pixel in the captured image. By way of example, the gray-scale values may span a range from 0 to 255 with 0 corresponding to black and 255 corresponding the brightest or most intense fluorescence of the biological points on the captured image. The gray-scale matrix may then be used to map the location, size and intensity of each detected sweat pore on the fingerpad image. Various known techniques may be used to extract this sweat pore information from the gray-scale matrix, including noise reduction, contrast enhancement, binarization, thinning, healing and feature extraction. For example, the data generated from the captured image may be filtered to decrease the effect of noise captured on the image.

The processor module 30 also may be configured to perform biometric identification in connection with processing the detected biometric information to an audio or ultrasonic acoustic signal, or a digital data communication signal representative of the individual's biometric information. To this end, the memory associated with the processor module is configured to store repository or reference biometric information for the one or more individuals. The processor module 20 is configured to use an algorithm to compare the detected biometric information with the repository of reference biometric information. After comparing the detected biometric information with the stored repository of reference biometric information, a determination is made as to whether the detected biometric information matches an entry in the stored repository of reference information. If a match is found, the processor module 30 may be configured to provide a unique audio or visual output representative of the individual's biometric information as a notification of positive biometric identification and/or a ultrasonic representation or digital data communication for transmission to an external device for authentication.

The processor module 30 may also be configured to process the detected biometric information for fanciful purposes. For example, the detected biometric information may comprise variable biometric information (such as the individual's detected sweat gland pore size, shape, fluorescence intensity or brightness, emitted electromagnetic field, body vibration, etc.) indicative of an individual's mood, energy level or general disposition. The processor module 20 may be configured to process an audio acoustic signal or visual display representative of the individual's detected variable biometric information as an indicator the individual's mood, energy level, or general disposition. For example, the processor module 30 may be configured to vary the volume, base intensity, or meter of a reference musical composition based on the detected variable biometric information. Alternatively, the processor module may be configured to select a musical composition from a repository of different musical compositions that is representative of the detected variable biometric information.

According to one embodiment of the present invention, processor module 20 may be configured to verify or authenticate the sensed biometric information. To this end, the processor module memory have be configured to store the detected biometric information and reference biometric information and perform verification and/or authentication routines. The processor module 30 may further be configured to generate an acoustic signal, visual display or digital data transmission upon successful verification and/or authentication.

Transmitter Module

According to one embodiment of the present invention, the transmitter module 40 may comprise a device configured to generate an acoustic signal such as a piezoelectric device or an electro acoustic transducer. For example, the device may comprise a signal generator for generating and emitting an audio-frequency acoustic signal and/or an ultrasonic-frequency acoustic signal.

Depending on the configuration of the processor module 30, transmitter module 40 may comprise a digital-to-analog module or an analog-to analog module for generating and emitting an acoustic signal representative of the detected biometric information. Alternatively, it will be understood that the processor module 30 and the transmitter module 40 may be integrated to comprise an analog-to-analog module for processing analog-based detected biometric information to an acoustic signal or a digital-to-analog module for processing digital-based detected biometric information to an acoustic signal.

According to an alternative embodiment of the present invention, the transmitter module 40 may comprise a wireless communication interface configured to transmit a digital communication signal encoded with a data stream representative of the detected biometric information.

Transmitter module 40 may be configured to transmit an acoustic signal or digital data communication signal representative of the individual's biometric information to a remote device for purposes of verification, authentication or audio signal transmission. For purposes of maintaining the confidentiality and/or proprietary integrity of the information, transmitter module 40 may be configured to transmit an ultrasonic acoustic signal or encrypted digital data communication signal to the remote device. According to this arrangement, the remote device may comprise a network server having a repository of reference biometric information. Upon receiving the ultrasonic acoustic signal or encrypted data communication signal, the remote device performs verification and/or authentication routines comparing the biometric information contained in the acoustic signal or encrypted data communication with the repository of reference biometric information.

Successful verification/authentication may result in providing the individual with access to a secure or restricted site, access to proprietary information, authorization for a commercial transaction, or the like. In addition, successful verification/authentication may result in the transmission of an audio signal. Such audio signal may be representative of the individual's biometric information.

Alternatively, successful verification/authentication may be used to announce the presence of or otherwise identify an individual. For example, successful verification/authentication may occur at the entrance of a site, and the audio signal generated based on the individual's biometric information may be a unique audio signal that may be recognizable by other individuals as belonging to a particular person. By way of further example, the audio signal may be a verbal representation of the individual's name.

It will be understood that the remote device may be a network server or database residing, for example on a LAN, WAN, the Internet, or any other network system, and that transmitter module 40 may be configured to communicate with the remote device via a wired or wireless communication protocol.

According to a further aspect of the present invention, the transmitter module 40 may comprise a laser projected sound device configured to imprint the acoustic output on an external object.

Network Systems

The apparatus of the present invention may also be used as one of a number of different apparatuses in a network system to form an interactive group environment. Exemplary applications for such an interactive group environment include computer-based (e.g., on-line) gaming environments, social media environments, and military and outerspace environments. The apparatus of the present invention may include a receiver module in addition to the transmitter module, or alternatively a transceiver module, to enable interaction and/or communication between different network apparatuses.

Examples of apparatus interaction may comprise the transmission of and receipt of acoustic signals and/or digital data communication signals derived from or representative of each user's biometric information. Such communication of signals may be used for verification or authentication of each individual's identity.

Further aspects of the present invention are described below with reference to FIGS. 4-6 and 9-13.

Figure 4:
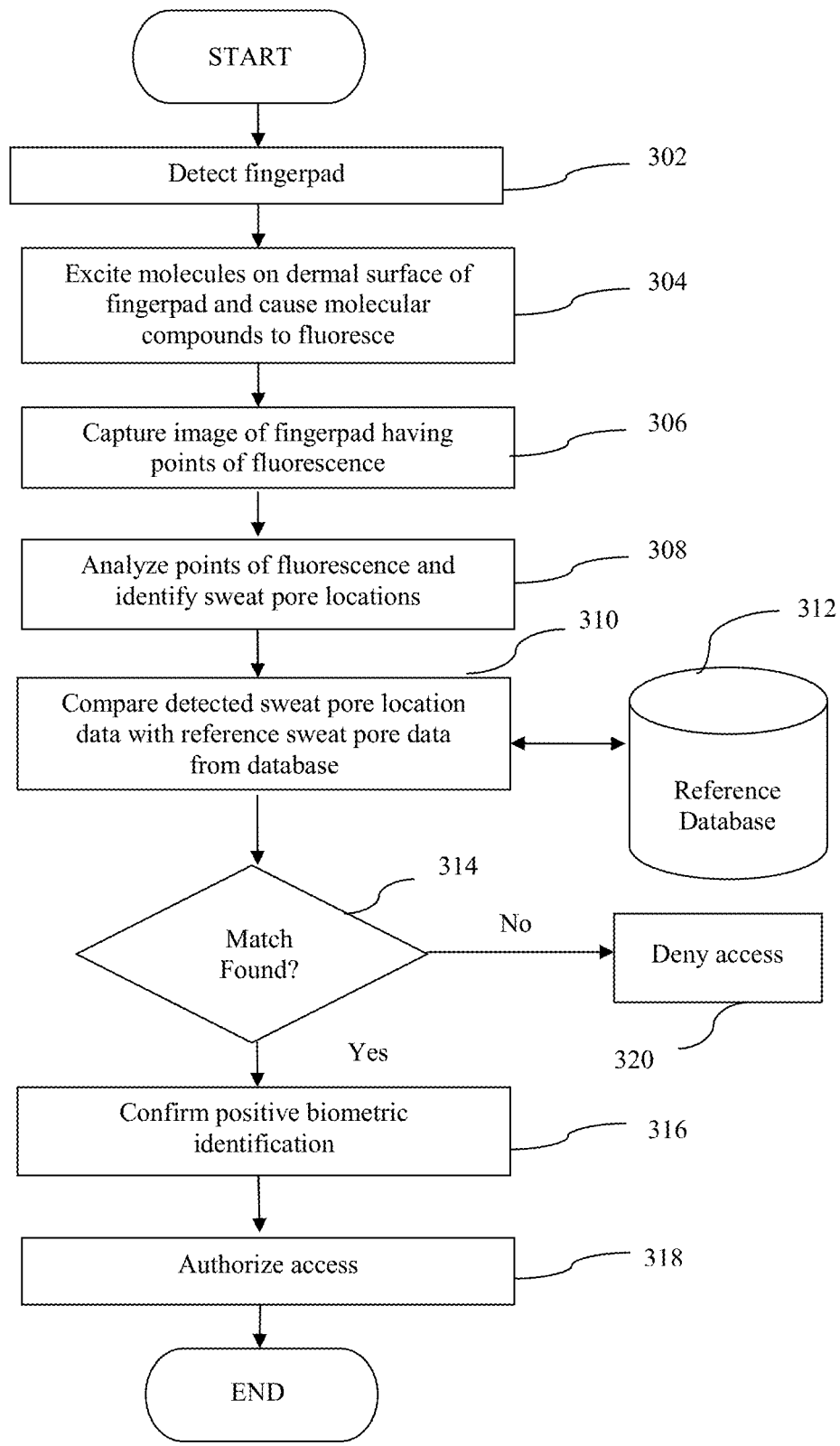
FIG. 4 is a flowchart illustrating an exemplary process for the detection and analysis of biometric information for biometric identification by the sensor and processing modules according to the present invention.

According to one embodiment of the present invention, the biometric identification system is designed to detect sweat pores, independent of any other feature of the dermal surface such as a fingerprint. FIG. 4 is a flowchart illustrating an exemplary process for detecting and analyzing sweat pores in accordance with the invention. The process shown in FIG. 4 may be implemented in a biometric identification and proof of life system using, for example, the apparatus shown in FIG. 2.

The process begins when the sweat pore biometric identification system detects a fingerpad on the top surface of a transparent plate (step 302). For example, sweat pore biometric identification apparatus 100 detects fingerpad 160 on the top surface of transparent electrode plate 110 in FIG. 2. The electrical current generated by voltage source 140 induces an electromagnetic field which stimulates and excites molecules associated with the dermal surface of the fingerpad and, thereby, causes compounds adjacent ions within the molecules to fluoresce (step 304). Then, the sweat gland pore biometric system uses an image capture device 150 (e.g., a CCD array camera) to obtain an image of the fingerpad with the fluoresced biological points, such as the fingerpad image shown in FIG. 4 (step 306). The capture of an image of the dermal surface having fluoresced biological points constitutes proof of liveness since only a living being is capable of providing such fluoresced biological points. The apparatus may include a controller (not shown) configured to interface with image capture device 150 to coordinate the detection of the fingerpad and the image capture of the fluoresced biological points on the fingerpad. Such a controller may also be configured to interface with voltage source 140 to coordinate the detection of the fingerpad and the generation of the electrical current and resulting electromagnetic field for stimulating and exciting the molecules associated with the dermal surface.

Next, the sweat pore biometric identification system analyzes the fluoresced biological points on the image (step 308) and uses an algorithm to compare the biometric information obtained from the image with reference biometric information stored in a repository, such as Reference Database 312 (step 310). The step of analyzing the fluoresced biological points may be performed by the sweat pore biometric identification apparatus 100 or a separate device (e.g., a secure network server or a local computer device) coupled in communication with apparatus 100. Similarly, the step of comparing the biometric information obtained from the captured image with the biometric information stored in a repository may be performed by the sweat pore biometric identification apparatus 100 or a separate device coupled in communication with apparatus 100. Reference Database 312 may be maintained on the apparatus, a local storage device or a remote storage device. For security purposes, communications within the sweat pore biometric identification system (e.g., between apparatus 100 and Reference Database 312) are preferably encrypted. For this same reason, data stored on Reference Database 312, apparatus 100 or any other device used in the sweat pore biometric identification system is preferably encrypted. Accordingly, apparatus 100 comprises cryptographic capabilities for encrypting transmitted communications, decrypting received encrypted communications and encrypting stored data.

Step 308 of analyzing the fluorescent biological points depicted on the captured image may include converting the visual information to a digital format. This may be done by any of a number of different techniques, including gray-scale analysis wherein a two-dimensional gray scale matrix is created by assigning gray-scale values for each pixel in the captured image. By way of example, the gray-scale values may span a range from 0 to 255 with 0 corresponding to black and 255 corresponding the brightest or most intense fluorescence of the biological points on the captured image. The gray-scale matrix may then be used to map the location, size and intensity of each detected sweat pore on the fingerpad image. Various known techniques may be used to extract this sweat pore information from the gray-scale matrix, including noise reduction, contrast enhancement, binarization, thinning, healing and feature extraction. For example, the data generated from the captured image may be filtered to decrease the effect of noise captured on the image. This gray-scale matrix data may be encoded in a biometric barcode as explained in more detail below.

After comparing the detected sweat pore biometric information with the stored reference biometric information, a determination is made as to whether the detected sweat pore biometric information matches an entry on the reference database (step 314). If no match is found (no output of step 314), the process proceeds to step 320. If a match is found (yes output of step 314), the process proceeds to step 316 where an indicator is provided confirming a positive biometric identification. Such an indicator is an optional feature of the illustrated process and may include a visual display and/or an audio signal. The process then proceeds to step 318 where the biometric identification system authorizes access to a secure area or device.

The process of comparing the sweat pore information from the captured image with the stored reference sweat pore information may involve matching the locations of detected sweat pore with reference sweat pore locations. For example, the number or percentage of matches may be measured by a correlation score. The correlation score may also take into account the number or percentage of false detected sweat pores (i.e., instances where there is no reference sweat pore location which corresponds to a detected sweat pore location). The correlation score is compared with a predetermined standard score for determining whether the detected biometric information matches the reference biometric information.

The sweat pore biometric identification system of the present invention may also be used to provide a second proof of liveness measure. Not only are an individual's sweat pores a fixed biometric in the sense that their locations remain unchanged throughout the individual's life, but they also can be considered as proof of liveness because the amount and composition of complex metabolic waste substances contained in sweat secreted from an individual sweat gland and the shape, size and degree to which each sweat pore is open (or even closed altogether or clogged) varies depending on certain conditions, including the prevailing emotional and/or physical state of the individual. Nerve fibers associated with an individual's sweat glands function to control the degree to which a sweat pore is open or even closed and the amount and composition of the sweat secreted from or contained within the sweat glands based on an individual's emotional state. For example, an individual's prevailing level of excitement, anxiety or fear may cause the nerve fibers to activate the sweat glands to secrete varying amounts of sweat. In addition, these nerve fibers may also cause an individual's sweat pores to open to varying degrees or even close in response to an individual's emotional state. In contrast, the lack of any detectable variation of the sensed biological points identifying the sweat pores is an indication of a spoofing attempt. This is because over time, there will necessarily be at least some minimal variation in the sensed biological points of a living being and identical or essentially identical repeated detection of these sensed biological points would indicate an artificial non-living biometric sample. Accordingly, an analysis of the variation of an individual's sweat pores can be used as a proof of liveness.

Figure 5:
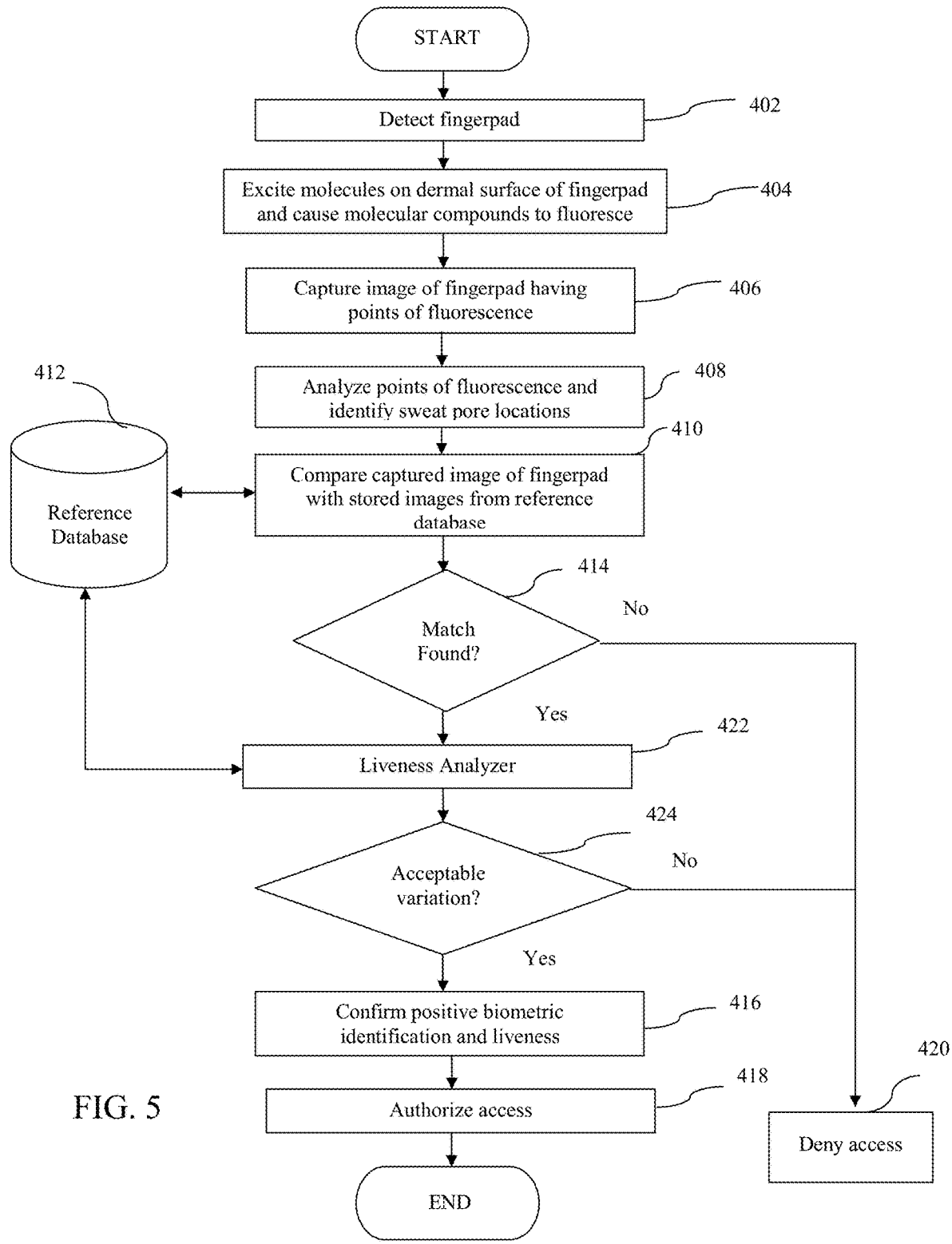
FIG. 5 is a flowchart illustrating an exemplary process for the detection and analysis of biometric identification and proof of liveness by the sensor and processing modules according to the present invention.

FIG. 5 provides a flowchart illustrating an exemplary process using sweat pore information as a biometric for identification and proof of liveness. The process shown in FIG. 5 may be implemented in a biometric identification and liveness system using, for example, the apparatus shown in FIG. 2.

As with the process illustrated in FIG. 4, the process starts by detecting a fingerpad on the top surface of a transparent electrode plate (step 402). Electrical current generated by voltage source 140 induces an electromagnetic field that stimulates and excites molecules associated with the dermal surface of the fingerpad causing the molecular compounds to fluoresce (step 404). Then an image capture device obtains an image derived from the fluoresced biological points (step 406).

Next the image is analyzed to identify sweat pore locations on the fingerpad (step 408) and the identified sweat pore locations are compared with reference sweat pore data stored on a database (step 410). Then a determination is made (step 414) if the identified sweat pore locations match an entry on the database. If no match is found, (no output of step 414), the process proceeds to step 420. If a match is found (yes output of step 414), the process proceeds to step 422.

In one embodiment, step 422 uses an algorithm to compare the sweat pore data detected from the individual and the matching reference database sweat pore data to determine the degree of variation therebetween. The variation analyzed by the algorithm may include the intensity or brightness of the fluorescence of one or more sweat pores, the size or shape of the sweat pores, and even the ability to detect the presence of one or more specific sweat pores. Alternatively, the liveness analyzer algorithm may compare past detected sweat pore data maintained in a reference database for the identified individual with the detected sweat pore data to determine the degree of variation therebetween. Or the liveness analyzer algorithm may compare successive contemporaneous detected sweat pore data to determine the degree of variation therebetween. Proof of liveness is established where there is at least some minimal variation in the compared sweat pore data. The lack of any variation would indicate an artificial biometric sample and yield a no output in step 424.

In addition, certain variations in an individual's detected sweat pores can be used as an indicator of the individual's emotional or physical state. For example, even if an individual biometric identification is verified or authenticated, the detected biometric information based on variation of sweat pore biometric information may be useful for identifying individuals who may be experiencing emotional, psychological or even physical distress. This information may be particularly useful for identifying individuals who may present potential security threats. Alternatively, this information may be useful to identify individuals who may be in need of immediate medical attention.

In another embodiment of the invention, the biometric identification apparatus is designed to detect the sweat gland pores along with a second biometric such as a fingerprint to enhance biometric identification reliability. Indeed, the unique method of stimulating the molecules associated with the fingerpad and causing molecular compounds to fluoresce in accordance with the present invention also enables the simultaneous detection of sweat pore and fingerprint biometric information. Specifically, the fluorescence of the molecular compounds not only creates biological points which identify the location of sweat gland pores, but also illuminates the fingerprint for image capture.

Figure 6:
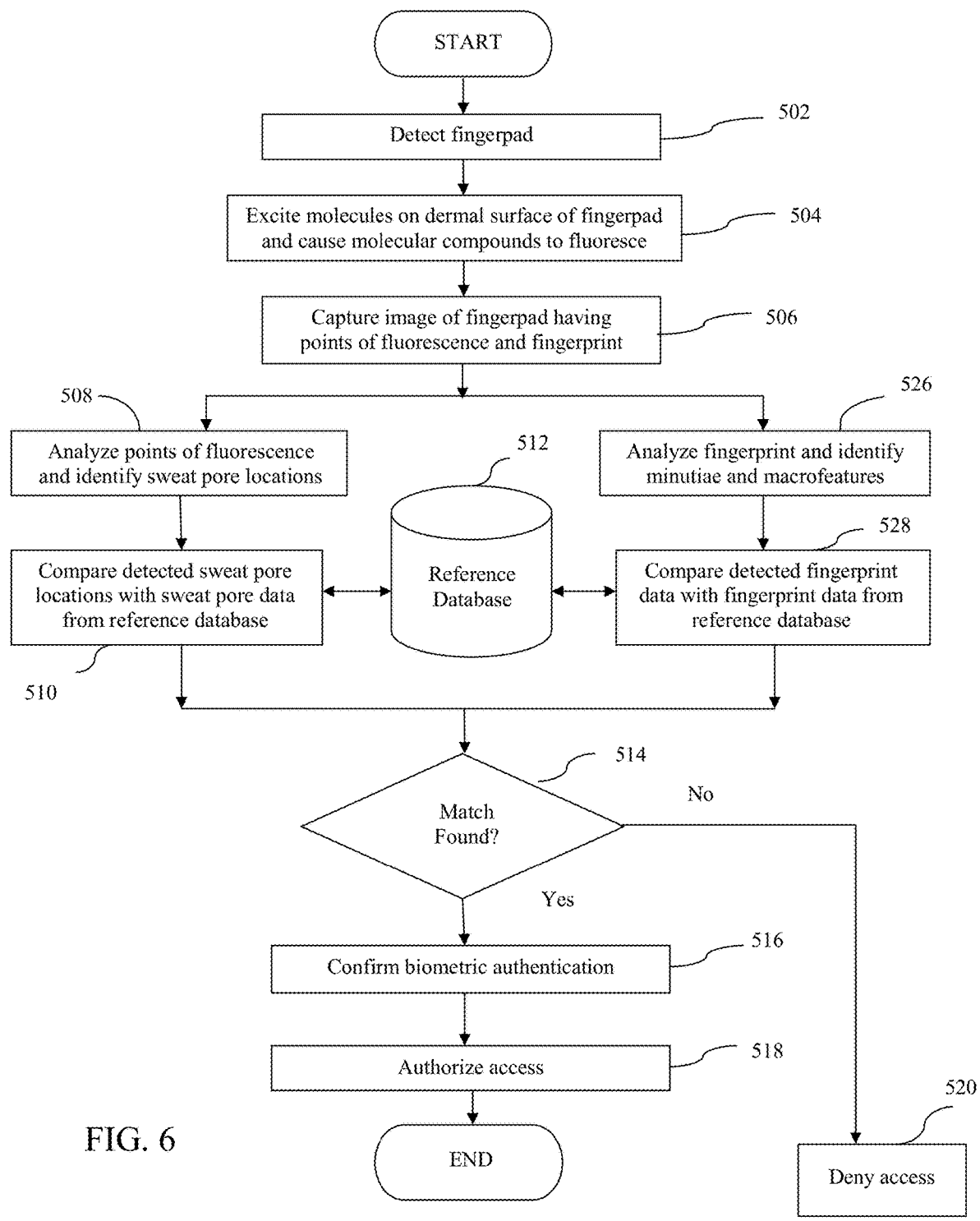
FIG. 6 is a flowchart illustrating an exemplary process for the detection and analysis of biometric information for biometric identification by the sensor and processing modules according to the present invention.

FIG. 6 is a flowchart illustrating an exemplary process for detecting and analyzing sweat gland pore and fingerprint biometric information in accordance with the present invention. The process shown in FIG. 6 may be implemented in a biometric identification system using, for example, the apparatus shown in FIG. 2.

As described above with reference to the exemplary biometric identification process illustrated in FIG. 4, the process begins with the detection of a fingerpad on the top surface of the transparent electrode plate (step 502). The electric current through electrode 140 generated by voltage source 140 induces an electromagnetic field 170 to stimulate and excite molecules associated with the dermal surface of the fingerpad and cause molecular compounds to fluoresce (step 504). An image capture device 150 then obtains an image of the fingerpad with the fluoresced biological points and illuminated fingerprint (step 506).

Next the biometric identification system analyzes the sweat gland pore biometric information in the form of the fluoresced biological points and identifies sweat gland pore locations (step 508). The locations of the sweat gland pores may be identified by x- and y-coordinates on a two-dimensional matrix containing a reference point. Such a reference point, for example, may be a designated minutiae or macrofeature identified on the fingerprint captured by the image. Alternatively, the relative locations of the sweat gland pores may be identified by vector plot coordinates.

The detected sweat gland pore locations are then compared with reference sweat gland pore biometric information maintained in a secure database 512 (step 510). In parallel with these sweat gland pore detection and comparison steps, the process also performs a fingerprint identification step, wherein the fingerprint pattern from the captured image is analyzed to identify unique minutiae and macrofeatures (step 526). Next, the minutiae and macrofeatures are compared to reference fingerprint data stored in a secured database (step 528). Finally, a combined determination providing enhanced reliability is made based on an evaluation of the matches resulting from both the sweat pore and fingerprint biometric identification processes (step 514). Alternatively, the sweat pore and fingerprint biometric identification processes may occur in series with either the sweat pore biometric identification providing a preliminary determination subject to confirmation by fingerprint biometric identification or vice versa.

This embodiment may be further adapted to perform a third biometric measure based on the combined sweat pore and fingerprint biometric information. Specifically, the minutiae or macrofeatures contained in the fingerprint may be used to facilitate a mapping of the sweat pore locations yielding a combined fingerprint/sweat pore biometric.

The biometric identification information obtained by the present invention may also be used to create a unique biometric barcode identifier for each individual. This barcode may be created using one or more of the biometric measures sensed by the present invention, including the x- and y-coordinates of the sweat gland pore locations on a two-dimensional matrix, sweat gland pore activity level as measured by brightness or intensity, fingerprint information (including ridge/valley patterns and minutiae/macrofeatures), and the locations of sweat gland pores relative to the fingerprint ridge/valley patterns and/or minutiae/macrofeatures.

As mentioned above, the fingerprint (ridge/valley patterns and minutiae/macrofeatures) and sweat gland pore locations on an individual's fingerpad are invariant throughout an individual's life and are generally considered fixed biometric measures. Accordingly, the locations of and spacing between the fingerprint ridges/valleys and minutiae/macrofeatures, as well as the locations of and spacing between sweat gland pores provide unique biometric measures for each individual. As disclosed above, in one embodiment the present invention yields an image derived from an individual's fingerpad containing both a fingerprint pattern and sweat pore locations identified by fluorescent biological points. According to the present invention, a biometric barcode may be created from a linear scan of the fingerprint biometric information and/or the sweat pore biometric information contained on the captured image.

More specifically, a linear scan of the image in a reference direction including a reference point may be reduced to binary data as a function of the position across the individual's fingerpad. For example, a linear scan of the sweat pore location information on the fingerpad image in the x-coordinate direction yields a signal with maxima and minima which correspond to fluoresced and non-fluoresced points on the image. The fluoresced points represent sweat pore locations and the non-fluoresced points represent space on the fingerpad between sweat pores. These maxima and minima are then reduced to a binary ONE or ZERO, respectively. This binary data can be further reduced to a series of lines and spaces of known widths to create a first unique barcode representative of the relative locations of sweat pores along the linear scan of the image in the x-coordinate direction. In this same manner, a second unique barcode identifier may be based on the relative locations of sweat gland pores along a linear scan of the image in the y-coordinate direction. Further, a third unique barcode identifier may be based on the activity level as indicated by measured brightness or intensity of the fluoresced points on the image along a linear scan of the image. In addition, a fourth unique barcode identifier representative of fingerprint ridge/valley pattern and/or minutiae/macrofeature locations may be derived from a linear scan of the image in a reference direction including a reference point. Each of these unique barcodes are referred to as a one-dimensional bar code since they are representative of a single biometric measure.

In addition to these three one-dimensional barcodes, any two of these barcodes may be combined to provide a two-dimensional barcode derived from two different biometric measures. Further, any three of these barcodes may be combined to provide a three-dimensional barcode derived from the three of the biometric measures. In addition, all four of the exemplary barcodes may be combined to provide a four-dimensional barcode.

These barcode identifiers may be used in a myriad of different ways with the biometric identification or authentication systems of the present invention. For example, these aspects of the invention may be used for verifying and authenticating an individual's identity in connection with commercial air travel. To this end, the process illustrated in FIG. 4 may be used to confirm that the passenger is approved for travel (i.e., not on a no-fly list). In order to obtain a ticket, the passenger must be authorized to travel via the process illustrated in FIG. 4. If authorized, the passenger's biometric barcode will be printed on the ticket. Next, in order to board the plane, the passenger must be authenticated using the process illustrated in FIG. 9 (described below). First, the passenger must present the ticket with the biometric barcode. Then the passenger's biometric identity must match the biometric identity associated with the barcode on the ticket. In addition, if the passenger checks luggage on the aircraft, the passenger's biometric barcode will be printed on each baggage tracking label. This will facilitate the retrieval of the passenger's checked baggage from the aircraft in the event the passenger doesn't board the aircraft or is denied boarding the aircraft. In addition, the barcode on the baggage tracking label may also be used at the baggage claim site to prevent unauthorized individual's from taking a passenger's luggage.

The biometric identification and barcode aspects of the present invention may also be used by mail delivery or courier services for assigning an individual's identity to a package or letter. In this regard, the biometric identification system and barcode enable the delivery or courier service to identify the individual who shipped a package or letter. As will be appreciated, this will function as a strong deterrent against the use of mail delivery or courier services for the shipment of illegal materials, including explosives or illicit drugs.

Alternatively, the biometric audio signal may be derived from an individual's barcode identifier. This biometric audio signal may be used as the audio signal broadcast to confirm positive biometric identification according to the optional feature of step 316 of the process illustrated in FIG. 4.

The present invention may also be adapted to detect and analyze the composition of the sweat contained in or secreted from an individual's sweat glands. To this end, the top surface of the transparent electrode may be coated with a transparent film that is designed to detect certain components in an individual's sweat. For example, it is known that sweat contains an individual's DNA fragments which may be detected and used as another source of biometric identification information. In addition, it is also known that sweat contains chemical compositions indicative of substances ingested by an individual such as alcohol or drugs (prescription or illicit). Moreover, the amounts of detected compositions in an individual's sweat may be indicative of the prevailing amount of alcohol or drugs in the individual's blood stream. Therefore, for example, the detection of an amount of a particular substance in an individual's sweat may be used to determine if the individual has a blood alcohol content exceeding a permissible limit. Similarly, this detection system may be used to determine if an individual is under the influence of an illicit drug. By way of further example, the detection of a substance indicative of the presence or level of a prescription drug in the individual's blood stream may be useful as a non-invasive method of determining whether an individual has a particular medical condition that merits attention.

Further, the present invention may be adapted to detect and analyze the composition of the sweat secreted from an individual's sweat pores for medical diagnostic purposes. For example, the chemical composition or temporal variation in the chemical composition of an individual's sweat may be indicative of the individual's health condition, including whether the individual has contracted a disease or illness.

Furthermore, the present invention may be adapted to detect, analyze and treat diseases such as cancerous skin cells. Specifically, the present invention may be adapted to detect cancerous skin cells based on detected variations, disturbances or fluctuations to an induced electromagnetic field. The present invention may further be configured to analyze the detected electromagnetic field disturbances and generate a subsequent customized electromagnetic field to treat the cancerous skin cells.

Moreover, the present invention may be adapted to detect and analyze the residual material or substances on an individual's dermal surface. To this end, the top surface of the transparent electrode may be covered with a transparent film which is designed to detect the existence of certain substances residing on the individual's dermal surface. For example, the transparent film may be used to detect any residual explosives material on an individual's fingers or palms. This information could be particularly useful for identifying individuals who may present potential security threats.

With regard to each of the detection systems for indicators based on the composition of the sweat or residual material or substances on the individual's dermal surface, the apparatus of FIG. 2 may be adapted to include a display screen for viewing by a security agent.

The biometric identification system of the present invention is particularly useful in a mobile system comprising a portable biometric identification detection device coupled via a communication network with a central database. To this end, the portable device may comprise a network communication interface for communicating with the central database. Alternatively, the portable device may comprise an external communication interface configured to communicate with a network device (such as a personal computer) having a network communication interface. The external communication interface may be a serial communication interface such as a universal serial bus or a wireless communication interface such as Bluetooth protocol.

Figure 9:
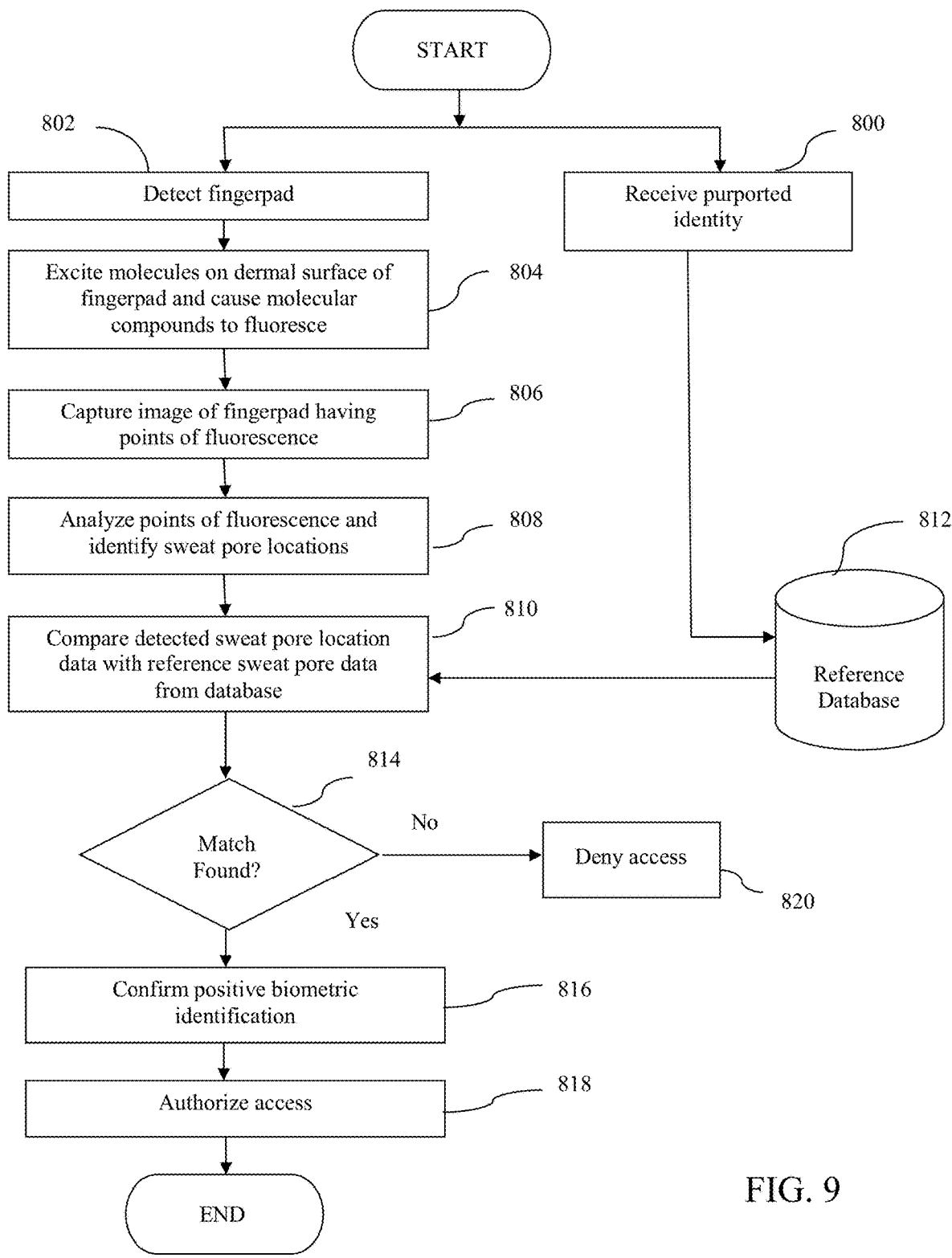
FIG. 9 is a flowchart illustrating an exemplary authentication process for the sensor and processing modules based on the detected biometric information in accordance with the present invention.

The present invention may also be used as a biometric authentication system for verifying the purported identity of an individual. FIG. 9 is a flowchart illustrating an exemplary biometric authentication process based on the detection and analysis of sweat pores in accordance with the present invention. The process shown in FIG. 9 may be implemented in a biometric system using, for example, the apparatus shown in FIG. 2.

The process begins when the apparatus receives an alleged identity from the subject individual (step 800). This step can be implemented where, for example, the subject individual presents an identification badge, passport, credit card, bank ATM card, VPN token or any other source of identification to a reader, scanner or any other device configured to receive identification information from the identification source. The apparatus itself may comprise a reference biometric identification database and perform the biometric authentication process. Alternatively, the authentication system may comprise a remote server configured to perform the authentication process and/or a remote database containing reference biometric identification information, wherein the server and/or database reside, for example, on a LAN, WAN or the Internet. For example, with regard to identification sources such as a credit card, bank ATM card or VPN token, the biometric authentication system may comprise a computer device having a network interface configured to communicate via a network, such as a LAN, WAN or the Internet, with a remote server and central database.

The process also proceeds from steps 802 to 808 in the same manner as described above with regard to the process illustrated in FIG. 4. As shown in FIG. 9, the purported identity information is inputted to the secure database 812, which in turn, submits reference biometric identification data for comparison with the detected sweat pore biometric data (step 810). After comparing the detected sweat pore biometric information with the stored reference biometric information, a determination is made as to whether the detected sweat pore biometric information matches the reference biometric identification data (step 814). If no match is found (no output of step 814), the process proceeds to step 820. If a match is found (yes output of step 814), the process proceeds to step 816 where an indicator is provided confirming a positive biometric authentication. Such an indicator is an optional feature of the invention and may include a visual display and/or an audio signal. The process then proceeds to step 820 where the biometric authentication system authorizes access to a secure area or device.

Thus, having described several embodiments, it will be recognized by those skilled in the art that various modifications, alternative configurations, and equivalents may be used in connection with the practice of the present invention. For example, the biometric identification and authentication processes of the exemplary embodiments illustrated in FIGS. 4-6 and 9 provide for authorized access to a secure area or device upon successful biometric identification or authentication. However, it will be understood that these processes may also be used in other contexts, including authorization for a commercial credit transaction or banking transaction. With regard to a commercial credit transaction, for example, the biometric identification and liveness process illustrated in FIG. 5 may be modified such that step 418 authorizes the execution of a commercial credit transaction involving an individual's online account. In this example, step 418 would involve transmitting a communication to a secure database authorizing a credit transaction for a specific account. The communication may be encoded with the individual's biometric data obtained from either the captured fingerpad image or the matching entry from the reference database for identifying the individual's account on the secure database. Such a system would circumvent many of the most prevalent identify theft issues as it would eliminate the need for an individual to present a credit card account number and use signature authorization. In addition, the written receipt confirming this transaction and the purchased product may be linked together by labeling or stamping each with the purchaser's identification bar code. This use of the individual's identification bar code may function as a theft deterrent system for a retailer and it may also function to confirm the authenticity of the original transaction in connection with the return of a product to the retailer for refund or exchange.

Figure 11:
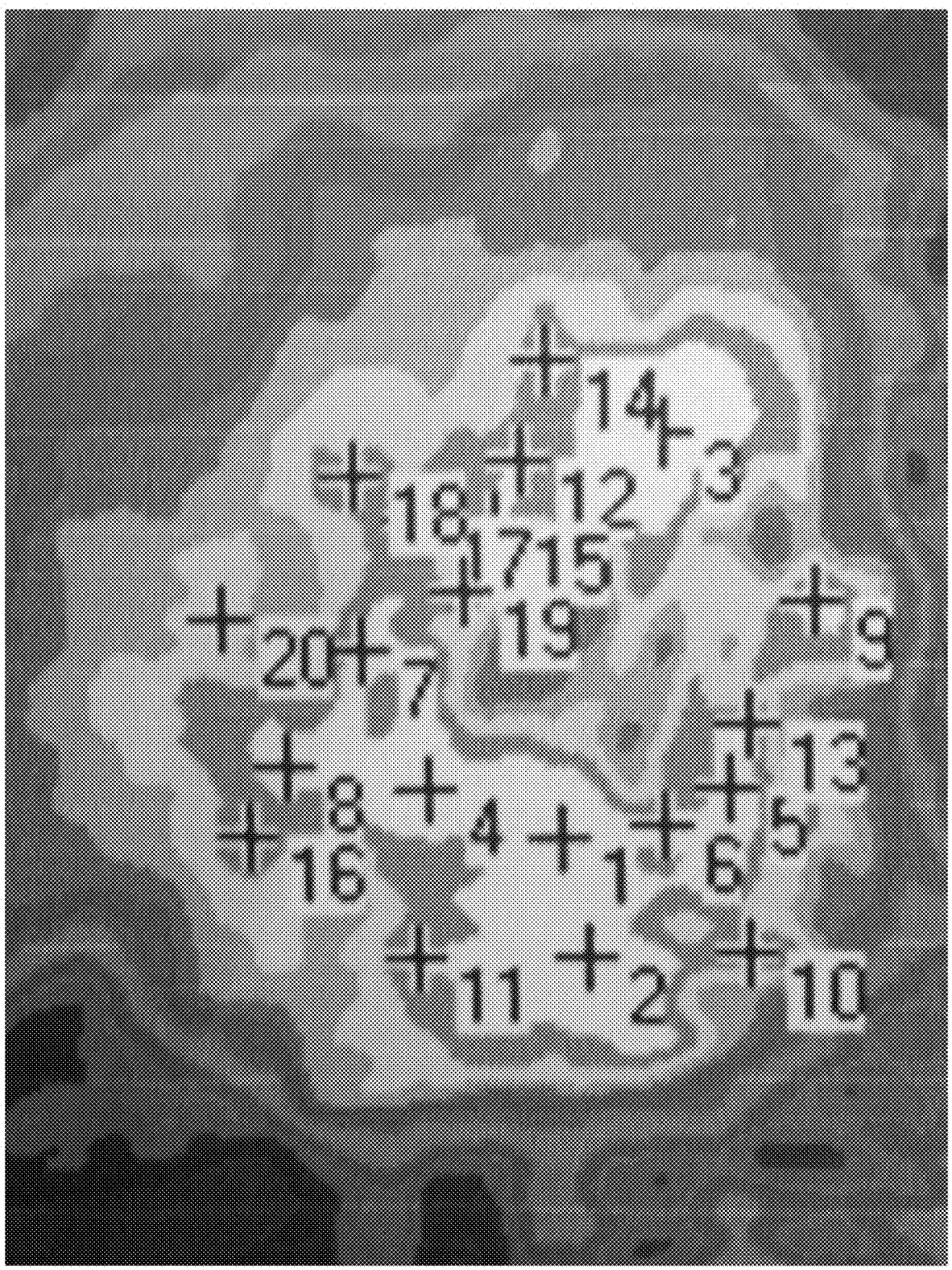
FIG. 11 is an exemplary illustration of a fingerpad image produced according to the exemplary embodiment of the sensor module shown in FIG. 10.

FIG. 11 is a schematic diagram illustrating another embodiment of the present invention for biometric identification and proof of liveness based on the detection and analysis of sweat gland pores on an individual's fingerpad.

As shown in FIG. 11, the biometric identification apparatus 900 comprises a voltage source 940, an electrode 910 and an electromagnetic field reader 980. Voltage source 940 is configured to generate an electrical current through electrode 910, which induces an electromagnetic field 970. Preferably, voltage source 940 is an alternating current voltage source and the resulting alternating electrical current transmitted through electrode 910 is between about 0.01 milliamps and about 25 milliamps, and more preferably between about 0.5 milliamps and about 5.0 milliamps. In addition, the resulting alternating electrical current transmitted through transparent electrode 910 preferably has a frequency of about 60 Hz or less, and more preferably between about 20 to about 50 Hz. It will be understood, however, that any electrical current that induces an electromagnetic field which enables biometric identification and/or proof of liveness based on the detection and analysis of sweat gland pores falls within the scope of the present invention. For example, a current greater than about 25 milliamps may be used if a suitable insulator is used to prevent physiological reaction with an individual's dermal surface. Similarly, a current less than about 0.01 milliamps may be used if a suitable amplifier or other device is used to enable the detection of the variations, fluctuations or disturbances to the electromagnetic field caused by the interaction with the individual's dermal surface. In addition, the electromagnetic field may be induced by a pulsed electrical current. Although not shown in FIG. 10, it will be appreciated that the electrical circuitry of apparatus 900 is configured to provide the desired electrical current through the electrode 910, which, in turn, induced electromagnetic field 970.

As shown in FIG. 11, electromagnetic field reader 980 may be integrally formed with electrode 910. Alternatively, it will be understood that electromagnetic field reader 980 may be positioned separately from electrode 910 at any location that is suitable for monitoring electromagnetic field 970. The top surface of the apparatus configured to receive the individual's fingerpad may optionally be coated with a polymer material 920 to prevent electrical charge from being transmitted to the individual's fingerpad.

According to this embodiment, the electrode 910 is configured to emit an electromagnetic field 970 induced by the electrical current generated by voltage source 940. Electromagnetic field reader 980 is configured to detect and capture information regarding electromagnetic field 970, including any variations, fluctuations or disturbances thereto when an individual's fingerpad is placed in the proximity of electromagnetic field 970. Apparatus 900 may include a controller (not shown) configured to interface with the electromagnetic field reader 980 and analyze the electromagnetic field information detected by the electromagnetic field reader 980 when the individual's fingerpad is placed in the proximity of electromagnetic field 970. The controller may comprise a graphics processor capable of storing, processing and/or generating an image representative of the electromagnetic field information detected by electromagnetic field reader 980.

It is also contemplated that quantum atom theory concepts associated with electromagnetic fields may be applied with regard to the detection, communication and comparison of biometric information based on the variations, fluctuations or disturbances in electromagnetic field 970. For example, the variations, fluctuations or disturbances to the electromagnetic field detected by the electromagnetic field reader 980 may be measures of atoms distorting the geometry of space and time ("spacetime") in the electromagnetic field. Further, the detected biometric information may be stored and communicated to a remote database via geometric fractals associated with the electromagnetic field.

Apparatus 900 may alternatively comprise an image capture device configured to obtain an image of the visible light range of the electromagnetic spectrum resulting from the interaction of an individual's fingerpad (an in this example, the sweat gland pores on the fingerpad) with electromagnetic field 970. According to this alternative arrangement, the image capture device is operatively coupled to the controller and the controller is configured to analyze the biometric information contained in the image of the visible light range of the electromagnetic spectrum.

Without wishing to be bound by any particular scientific theory or explanation, applicant believes that the physical characteristics of the sweat gland pores and/or the materials contained therein have conductive properties which interact with and cause variations, fluctuations or disturbances to electromagnetic field 970. Moreover, the detected variations, fluctuations or disturbances to electromagnetic field 970 are indicative of the location, shape and size of the sweat gland pores. It is also believed that the unique concaved contour of the sweat gland pore also interacts with and causes variations, fluctuations and disturbances to the electromagnetic field from which sweat gland pore biometric information may be derived. Surprisingly, applicant has discovered that this method also detects the location of closed or clogged sweat gland pores. This unexpected result provides enhanced reliability for the detection of sweat gland pore biometric identification.

FIG. 11 is an image of the visible light range of the electromagnetic spectrum representing sweat gland pore biometric information. This image may be obtained by an image capture device or generated by a graphics processor based on electromagnetic field data detected by an electromagnetic field reader. The image represents three sweat gland pore biometric measures derived from the variations, disturbances and fluctuations in the electromagnetic field 970. Each cross mark (separately numbered 1-20) represents the x- and y-coordinate locations of a sweat gland pore on a two-dimensional matrix. In addition, the activity level of each sweat gland pore contributes to the intensity of the electromagnetic disturbance and is shown by the color groupings in the image. These color groupings also correspond to the brightness of the fluorescence of the sweat gland pores as detected by the embodiment of the invention described above with reference to FIG. 2. Sweat gland pores 1-9 form a first cluster of sweat gland pores which define the white region of the image and have the highest activity level or brightest fluorescence. Similarly, sweat gland pores 10-18 form a second cluster of sweat gland pores which define the blue region in the image and have the second highest activity level or fluorescence. Sweat gland pores 19 and 20 form a third cluster of sweat gland pores which define the yellow region in the image and have the third highest activity level or fluorescence. It will be understood that each of these colored regions may also include closed or clogged pores not designated by a cross mark and which do not contribute any intensity level or fluorescence to the image.

The x- and y-locations of the sweat gland pores and the configuration of the colored regions show in the image of FIG. 11 can be used as a combined biometric measure and proof of liveness. First, the x- and y-locations of the sweat gland pores are a static biometric that can be compared with a reference biometric for authentication or verification purposes. Because sweat gland pores may become clogged or closed at any given time, a comparison of the detected and reference sweat gland pore locations which yields a sufficient number of positive matching detected sweat gland pores results in a positive identification. Because the activity level of any given sweat gland pore varies over time, a sufficient minimal variation in the configuration of the colored regions of the image is indicative of proof of liveness.

Figure 12:
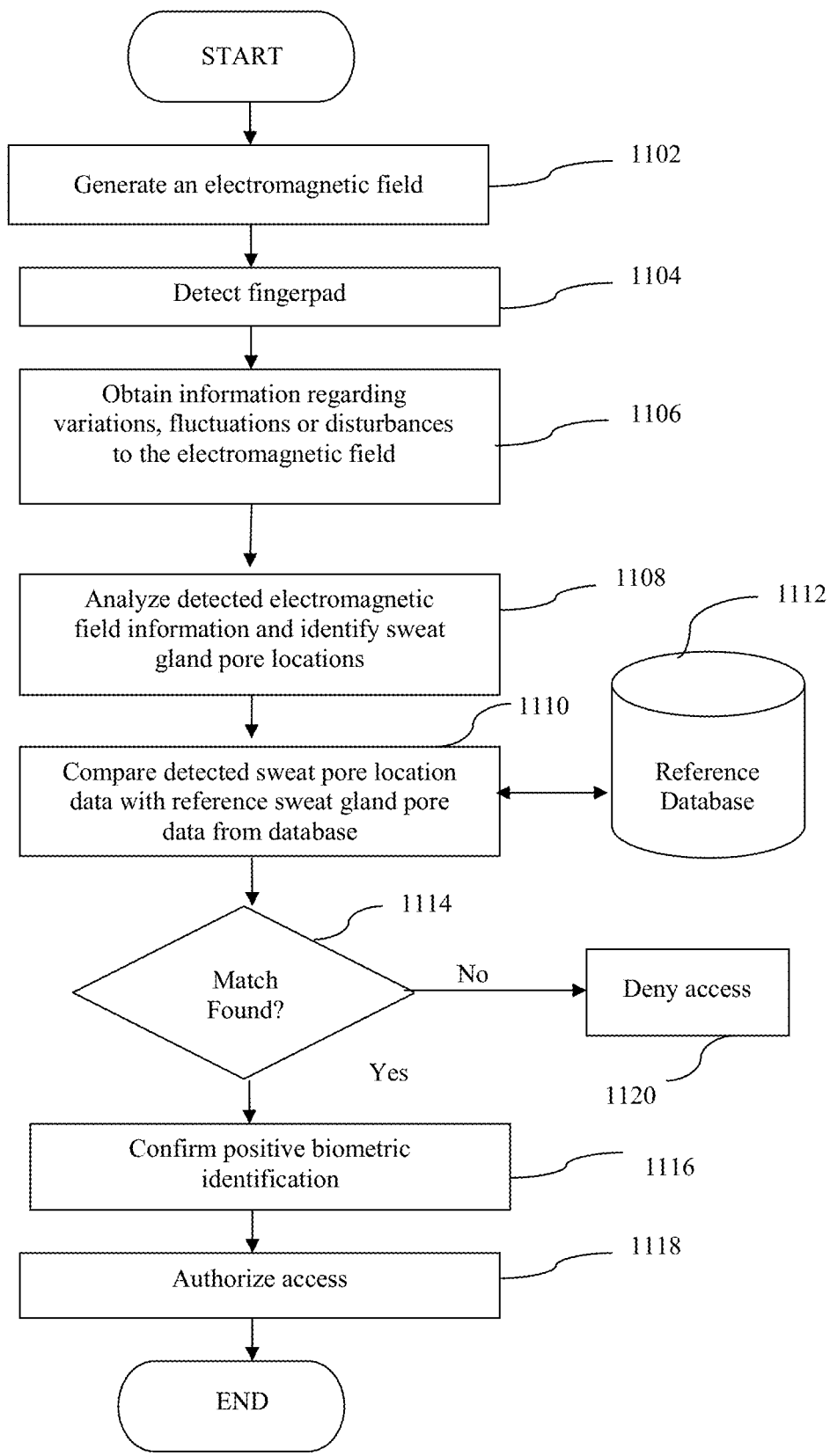
FIG. 12 is a flowchart illustrating an exemplary process for the detection and analysis of biometric information for biometric identification by the sensor and processing modules according to the present invention.

FIG. 12 is a flowchart illustrating an exemplary process for a biometric identification and proof of life system using the apparatus shown in FIG. 10. In the initial state (step 1102), voltage source 940 generates an electrical current in electrode 910, which, in turn, induces an electromagnetic field 970 across the surface configured for receiving the individual's fingerpad. The sweat pore biometric identification system then detects the individual's fingerpad (step 1104). Subsequent to detecting the fingerpad in step 1104, the electromagnetic field reader obtains information regarding variations, fluctuations or disturbances to the electromagnetic field resulting from interaction with the electromagnetic field by the individual's fingerpad (step 1106). These variations, fluctuations or disturbances are then correlated to identify the detected locations and physical contours, including the size and shape, of the sweat gland pores (step 1108).

Next, the sweat gland pore biometric identification system uses an algorithm to compare the detected sweat gland pore biometric information with reference biometric information stored in a repository, such as Reference Database 1112 (step 1110). The step of analyzing the detected sweat gland pore biometric information may be performed by the sweat gland pore biometric identification apparatus 900 or a separate device (e.g., a secure network server or a local computer device) coupled in communication with apparatus 900. Similarly, the step 1110 of comparing the detected biometric information with the biometric information stored in a repository may be performed by the sweat pore biometric identification apparatus 900 or a separate device coupled in communication with apparatus 900. Reference Database 1112 may be maintained on the apparatus 900, a local storage device or a remote storage device. For security purposes, communications within the sweat pore biometric identification system (e.g., between apparatus 900 and Reference Database 1112) are preferably encrypted. For this same reason, data stored on Reference Database 1112, apparatus 900 or any other device used in the sweat pore biometric identification system is preferably encrypted. Accordingly, apparatus 900 comprises cryptographic capabilities for encrypting transmitted communications, decrypting received encrypted communications and encrypting stored data.

After comparing the detected sweat pore biometric information with the stored reference biometric information, a determination is made as to whether the detected sweat pore biometric information matches an entry on the reference database (step 1114). If no match is found (no output of step 1114), the process proceeds to step 1120. If a match is found (yes output of step 1114), the process proceeds to step 1116 where an indicator is provided confirming a positive biometric identification. Such an indicator is an optional feature of the illustrated process and may include a visual display and/or an audio signal. The process then proceeds to step 1118 where the biometric identification system authorizes access to a secure area or device.

In the same general manner described above with reference to FIG. 12, the alternative embodiment illustrated in FIG. 10 may also be implemented in a sweat gland pore biometric identification system and liveness system as described in connection with FIG. 5. With regard to the apparatus shown in FIG. 10, it will be understood that the detected sweat gland pore location, shape and size information constitutes proof of liveness since these are not static biometrics for a living being. For example, proof of liveness can be determined if there is sufficient match between the detected and referenced sweat gland pore locations and at least a minimal variation between the shape and size of the matching sweat gland pores.

Similarly, the alternative embodiment illustrated in FIG. 10 can also be implemented in a dual biometric identification system involving the detection and analysis of sweat gland pore and fingerprint information. To this end, the apparatus illustrated in FIG. 10 may be modified to include a transparent electrode and an image capture or scanning device to obtain the individual's fingerprint biometric information. The sweat gland pore and fingerprint verification steps may occur in parallel as shown in FIG. 6 or in series.

In addition, the alternative embodiment of the present invention illustrated in FIG. 10 may be implemented in an authentication process based on the detection and analysis of sweat gland pore information as generally described in FIG. 6.

The embodiment shown in FIG. 10 may also be configured as a biometric tape or film for use in a variety of applications. In the same manner described above with reference to FIG. 10, the biometric tape comprises a conductor which is configured to carry an electrical current and generate an electromagnetic field. The biometric tape further comprises an electromagnetic field reader which detects the distribution of the electromagnetic field generated by the conductor. When an individual contacts the biometric tape, the electromagnetic field reader detects any variations, fluctuations or disturbances to the distribution of the electromagnetic field generated by the electrical current in the conductor. The biometric tape may further comprise a voltage source for generating the electrical current, a graphics processor for processing the data detected by the electromagnetic field reader and/or generating a graphic representation depending on the result of the authentication or verification process, a memory for storing the detected biometric information and a wireless communication interface for transmitting the detected biometric information to a remote network for comparison with reference biometric information for authentication or verification. Alternatively, the biometric tape memory may be configured to store the reference biometric information and the biometric tape processor may be configured to perform the authentication or verification routines. In addition, the voltage source may be external to the biometric tape.

It will be understood that the biometric tape or film may be flexible and lend itself to many different applications. For example, the biometric tape or film may be integrated into the outer surface glove (e.g., the palm and/or finger portions of the glove) and enable an individual wearing the glove to perform biometric identification of an individual who contacts the outside surface of the glove. In addition, the tape or film may be placed on an object such as a door knob or automobile door handle to detect the biometric identity of any individual who attempts to open the door. The biometric tape or film may be applied to any other device or substrate (such as a telephone handset or automobile steering wheel) that may be contacted by an individual's dermal surface containing sweat gland pores.

Figure 13:
FIG. 13 is an illustration of a triggering system for capturing biometric identification information according to the present invention.

The detection systems according to the present invention may further comprise a sensor which detects an individual's finger in the proximity of the top surface of the electrode and actuates the image capture device or voltage source to generate an electrical current through electrode, which, in turn, induces the electromagnetic field. In the embodiment shown in FIG. 2, image capture device 150 may be configured to constantly monitor for any object that is placed in the vicinity of the transparent electrode 110. The image capture device 150 may be further configured to detect the general characteristics of a fingerprint. As shown in FIG. 13, for example, such general characteristics may be the width of the fingerprint ridges A separated by a fingerprint valley or trough B. When the image capture device recognizes these general features of a fingerprint in the vicinity of the transparent electrode, it will automatically trigger an image capture of the fingerpad to obtain an image of the fluoresced biological points excited by the electromagnetic field.

With regard to the embodiment of the present invention shown in FIG. 10, the electromagnetic field reader may be configured to detect a fingerpad in the vicinity of the electromagnetic field. For example, the electromagnetic field reader may be in constant detection mode for the variations, fluctuations or disturbances to the electromagnetic field that are indicate of the features of a fingerpad. The detection of electromagnetic field disturbances representative of the general shape and size of one or more sweat gland pores may act a trigger for the electromagnetic field reader to obtain more extensive information regarding the disturbances to the entire electromagnetic field distribution. Alternatively, the electromagnetic field reader may be triggered by the detection of disturbances representative of the presence of sweat gland crystals in the electromagnetic field.

What is claimed is:

1. A device comprising:
   (a) a sensor configured to detect an individual's biometric identifier information comprising facial features;
   (b) a processor configured to analyze the individual's detected biometric identifier information and generate a signal derived from and representative of the detected biometric identifier information; and
   (c) a transmitter configured to output an acoustic signal corresponding to the signal derived from and representative to the detected biometric identifier information.

2. The device according to claim 1, wherein the acoustic signal comprises an ultrasonic signal.

3. The device according to claim 1, wherein the acoustic signal comprises an audio signal.

4. The device according to claim 3, wherein the audio signal comprises a musical value comprising a plurality of musical elements.

5. The device according to claim 4, wherein the plurality of musical elements comprise one or more of key signatures, octave scales, major root scales, minor root scales, notes, chords, scales, inversions, chromatic scales, meter, tempo, rhythm, beat, cadence, reverb, volume amplitude, velocity, and base intensity.

6. The device according to claim 3, wherein the audio signal comprises two or more musical values.

7. The device according to claim 1, wherein the processor is configured to authenticate the individual's identity based on the detected biometric identifier information.

8. The device according to claim 1, wherein the device further comprises a receiver configured to receive a signal generated as a function of a second individual's biometric identifier information.

9. The device according to claim 8, wherein the transmitter is further configured to output an acoustic signal based on the received signal.

10. The device according to claim 9, wherein the acoustic signal based on the received signal comprises an audio signal.

11. The device according to claim 8, wherein the processor is configured to authenticate the second individual's identity based on the received signal.

12. The device according to claim 1, wherein the device further comprises a network interface configured to enable the transmission of communications between the device and a communications network comprising a plurality of communications nodes, and the transmitter is configured to output the acoustic signal in response to a communication received by the device from a communications network node.

13. The device according to claim 12, wherein the device is configured to transmit a digital data communication encoded with the signal derived from and representative of the individual's detected biometric identifier information through the network interface to a communications network node, and the transmitter is configured to output the acoustic signal in response to a communication received by the device from the communications network node, wherein the communication received by the device is indicative of a positive authentication determination based on the individual's detected biometric identifier information encoded in the digital data communication transmitted by the device.

14. The device according to claim 1, wherein the device further comprises a network interface configured to communicate with a communications network comprising at least one network node.

15. The device according to claim 14, wherein the device network interface is configured to receive a communication from a network node.

16. The device according to claim 14, wherein the communication received from the network node is encoded with an individual's biometric identifier information.

17. The device according to claim 16, wherein the transmitter is configured to output an acoustic signal corresponding to the individual's biometric identifier information encoded in the communication received from the network node.

18. The device according to claim 17, wherein the acoustic signal corresponding to the individual's biometric identifier information encoded in the communication received from the network node comprises an ultrasonic signal.

19. The device according to claim 17, wherein the acoustic signal corresponding to the individual's biometric identifier information encoded in the communication received from the network node comprises an audio signal.

20. The device according to claim 19, wherein the audio signal corresponding to the individual's biometric identifier information encoded in the communication received from the network node comprises a musical value.

21. The device according to claim 20, wherein the device further comprises a memory and the device is configured to store the individual's biometric identifier information encoded in the communication received from the network node.

22. The device according to claim 1, wherein the signal comprises a digital data signal encoded with a musical value comprising a plurality of musical elements derived from and representative of the first individual's detected biometric identifier information.

23. The device according to claim 1, wherein the processor is configured to apply a biometric conversion algorithm to generate the signal derived from and representative of the individual's detected biometric identifier information.

24. The device according to claim 1, wherein the processor is configured to represent the individual's detected biometric identifier information in a barcode format.

25. A device comprising:
(a) a sensor configured to detect an individual's biometric identifier information comprising facial features;
(b) a processor configured to analyze the individual's detected biometric identifier information and generate a signal derived from and representative of the detected biometric identifier information;
(c) a memory in communication with the processor and configured to store the signal derived from and representative of the detected biometric identifier information;
(d) a transmitter configured to output an acoustic signal corresponding to the signal derived from and representative of the detected biometric identifier information; and
(e) a communication interface configured to enable access to the signal derived from and representative of the detected biometric identifier information.

26. The device according to claim 25, wherein the communication interface comprises a network interface configured to enable the transmission of communications between the device and a communications network comprising at least one communications network node.

27. A system comprising:
(a) a first device comprising (i) a sensor configured to detect an individual's biometric identifier information comprising facial features, (ii) a processor configured to analyze the individual's detected biometric identifier information and generate a signal derived from and representative of the individual's detected biometric identifier information, and (iii) a transmitter configured to output the signal derived from and representative of the individual's detected biometric identifier information, and
(b) a second device comprising (i) a receiver configured to receive the signal from the first device transmitter and (ii) a transmitter configured to output an acoustic signal corresponding to the received derived from and representative of the individual's biometric identifier information detected by the first device.

28. The system according to claim 27, wherein the acoustic signal outputted by the second device transmitter comprises an audio signal.

29. The system according to claim 27, wherein the acoustic signal outputted by the second device transmitter comprises an ultrasonic signal.

30. The system according to claim 27, wherein the signal derived from and representative of the individual's detected biometric identifier information comprises a digital data signal.

31. The system according to claim 30, wherein the second device further comprises a memory, and the second device is configured to store on the memory the digital data signal received from the first device transmitter.

32. A method for biometric identification comprising the steps of: detecting an individual's biometric identifier information comprising facial features; converting the individual's detected biometric identifier information to a signal derived from and representative of the individual's detected biometric identifier information; and outputting an acoustic signal corresponding to the signal derived from and representative of the individual's detected biometric identifier information.

33. The method according to claim 32, wherein the acoustic signal comprises an audio signal.

34. The method according to claim 33, wherein the audio signal comprises a musical value comprising a plurality of musical elements.

35. The method according to claim 34, wherein the plurality of musical elements comprise one or more of key signatures, octave scales, major root scales, minor root scales, notes, chords, scales, inversions, chromatic scales, meter, tempo, rhythm, beat, cadence, reverb, volume amplitude, velocity, and base intensity.

36. A device comprising:
(a) a sensor configured to detect a first individual's biometric identifier information comprising facial features;
(b) a processor configured to analyze the first individual's detected biometric identifier information and generate a signal derived from and representative of the first individual's detected biometric identifier information;
(c) a network interface configured to enable the transmission of communications between the device and a communications network comprising a plurality of communications network devices, wherein the device is configured to transmit a communication encoded with the first individual's detected biometric identifier information through the network interface to a communications network device and wherein the device is configured to receive a communication encoded with a second individual's detected biometric information comprising facial features from the communications network device; and
(d) a transmitter configured to output an acoustic signal based on the second individual's detected biometric information encoded in the communication received from the communications network device.

37. The device according to claim 36, wherein the acoustic signal comprises an ultrasonic signal.

38. The device according to claim 36, wherein the acoustic signal comprises an audio signal.

39. The device according to claim 38, wherein the audio signal comprises a musical value comprising a plurality of musical elements.

40. The device according to claim 39, wherein the plurality of musical elements comprise one or more of key signatures, octave scales, major root scales, minor root scales, notes, chords, scales, inversions, chromatic scales, meter, tempo, rhythm, beat, cadence, reverb, volume amplitude, velocity, and base intensity.

41. The device according to claim 38, wherein the audio signal comprises two or more musical values.

42. A system comprising a communications network comprising a plurality of network devices having compatible communication interfaces, the system comprising:
(a) a first network device comprising:
(i) a sensor configured to detect an individual's biometric identifier information comprising facial features;
(ii) a processor configured to analyze the individual's detected biometric identifier information and generate a signal derived from and representative of the individual's detected biometric identifier information;
(iii) a network interface configured to enable the transmission of a communication encoded with the signal derived from and representative of the individual's detected biometric identifier information through the network interface to a network device; and (b) a second network device comprising:
  (i) a network interface configured to enable the transmission of communications between the second network device and the communications network, wherein the second network device network interface is configured to receive the communication encoded with the signal derived from and representative of the individual's detected biometric identifier information transmitted by the first network device; and
  (ii) a transmitter configured to output an acoustic signal corresponding to the signal derived from and representative of the individual's detected biometric information encoded in the communication transmitted by the first network device.

43. The system according to claim 42 further comprising a third network device comprising a network interface configured to enable the transmission of communications between the third network device, the first network device and the second network device, wherein the third network device is configured to (a) receive the communication encoded with the signal derived from and representative of the individual's detected biometric information transmitted by the first network device, (b) authenticate the identity of the individual based on the individual's detected biometric information encoded in the communication received from the first network device, and (c) transmit the communication encoded with the signal derived from an representative of the individual's detected biometric identifier information to the second network device.

44. The system according to claim 43, wherein the second network device transmitter is configured to output an acoustic signal based on the individual's detected biometric information in response to receiving a communication from the third network device indicative of the authentication of the identity of the individual based on the individual's detected biometric identifier information encoded in the communication transmitted by the first network device.

45. The device according to claim 44, wherein the acoustic signal comprises an ultrasonic signal.

46. The system according to claim 44, wherein the acoustic signal comprises an audio signal.

47. The system according to claim 46, wherein the audio signal comprises a musical value comprising a plurality of musical elements.

48. The system according to claim 47, wherein the plurality of musical elements comprise one or more of key signatures, octave scales, major root scales, minor root scales, notes, chords, scales, inversions, chromatic scales, meter, tempo, rhythm, beat, cadence, reverb, volume amplitude, velocity, and base intensity.

49. The system according to claim 46, wherein the audio signal comprises two or more musical values.

50. A system comprising a communications network comprising a plurality of network devices having compatible communication interfaces, the system comprising:
  (a) a first device comprising:
    (i) a sensor configured to detect an individual's biometric identifier information comprising facial features;
    (ii) a processor configured to analyze the individual's detected biometric identifier information and generate a machine-readable representation encoded with the individual's detected biometric identifier information;
    (iii) a display configured to present the machine-readable representation encoded with the individual's detected biometric identifier information; and
  (b) a second device comprising:
    (i) a sensor configured to detect the machine-readable representation encoded with the individual's detected biometric identifier information presented by the first device; and
    (ii) a transmitter configured to output an acoustic signal derived from and representative of the individual's detected biometric identifier information encoded in the detected machine-readable representation.

51. The system according to claim 50, wherein the machine-readable representation comprises a barcode.

52. The system according to claim 50, wherein the acoustic signal comprises an ultrasonic signal.

53. The system according to claim 50, wherein the acoustic signal comprises an audio signal.

54. The system according to claim 53, wherein the audio signal comprises a musical value comprising a plurality of musical elements.

55. The system according to claim 54, wherein the plurality of musical elements comprise one or more of key signatures, octave scales, major root scales, minor root scales, notes, chords, scales, inversions, chromatic scales, meter, tempo, rhythm, beat, cadence, reverb, volume amplitude, velocity, and base intensity.

56. The system according to claim 53, wherein the audio signal comprises two or more musical values.

* * * * *